US011767899B2

(12) United States Patent
Watanabe et al.

(10) Patent No.: US 11,767,899 B2
(45) Date of Patent: Sep. 26, 2023

(54) POWER TRANSMISSION DEVICE

(71) Applicant: YUTAKA GIKEN CO., LTD., Hamamatsu (JP)

(72) Inventors: Kentaro Watanabe, Hamamatsu (JP); Kazuto Nagaishi, Hamamatsu (JP); Makoto Hiruta, Hamamatsu (JP); Tatsuya Muramatsu, Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 671 days.

(21) Appl. No.: 16/890,177

(22) Filed: Jun. 2, 2020

(65) Prior Publication Data

US 2020/0393018 A1 Dec. 17, 2020

(30) Foreign Application Priority Data

Jun. 12, 2019 (JP) .................................. 2019-109575
Sep. 25, 2019 (JP) .................................. 2019-174745

(51) Int. Cl.
*F16H 61/14* (2006.01)
*F16F 15/123* (2006.01)
*F16F 15/121* (2006.01)

(52) U.S. Cl.
CPC .... *F16F 15/12306* (2013.01); *F16F 15/1218* (2013.01); *F16H 61/148* (2013.01); *F16F 2228/08* (2013.01); *F16F 2236/08* (2013.01)

(58) Field of Classification Search
CPC ............. F16F 15/12306; F16F 15/1218; F16F 2228/08; F16F 2236/08; F16F 41/00; F16H 61/148; F16H 45/02
See application file for complete search history.

(56) References Cited

U.S. PATENT DOCUMENTS 7,066,312 B2 * 6/2006 Abe .................. F16H 45/02
192/3.29
7,284,645 B2 * 10/2007 Yamamoto .............. F16H 45/02
192/112

(Continued)

FOREIGN PATENT DOCUMENTS

| EP | 3 244 092 A1 | 11/2017 |
| JP | H09-53700 A | 2/1997 |
| JP | 2009-222088 A | 10/2009 |
| JP | 2015-140847 A | 8/2015 |
| JP | 2015-212568 A | 11/2015 |

(Continued)

OTHER PUBLICATIONS

Official Communication dated Apr. 20, 2022 issued in corresponding Japanese Patent Application No. 2019-109575 with the English translation thereof.

(Continued)

*Primary Examiner* — Thomas W Irvin
(74) *Attorney, Agent, or Firm* — Carrier, Shende & Associates P.C.; Joseph P. Carrier; Fulchand P. Shende

(57) ABSTRACT

In a power transmission device, a dynamic damper is provided in a power transmission path having at least one damper disposed therein, and has an inertial rotating body that can rotate relative to a transmission rotating member forming part of the power transmission path, and a dynamic damper spring that can provide connection between the transmission rotating member and the inertial rotating body. A preset load is applied to the dynamic damper spring in a non-transmitting state of the power transmission path. The dynamic damper spring is supported on either one of the transmission rotating member and the inertial rotating body so as to apply the preset load to the dynamic damper spring in the non-transmitting state, and a gap is set in a rotational direction in the non-transmitting state between the dynamic damper spring and an other one of the transmission rotating member and the inertial rotating body.

11 Claims, 16 Drawing Sheets

(56) References Cited

U.S. PATENT DOCUMENTS

| | | | |
|---|---|---|---|
| 8,096,885 B2* | 1/2012 | MacDonald | F16F 15/123 29/446 |
| 8,266,983 B2* | 9/2012 | Kaneyasu | F16H 45/02 74/574.4 |
| 9,618,105 B2 | 4/2017 | Kawahara et al. | |
| 10,253,842 B2 | 4/2019 | Okaji et al. | |
| 10,267,377 B2 | 4/2019 | Okaji et al. | |
| 10,683,908 B2 | 6/2020 | Watanabe et al. | |
| 2009/0032364 A1* | 2/2009 | MacDonald | F16F 15/123 267/140.12 |
| 2011/0132137 A1* | 6/2011 | Kaneyasu | F16F 15/12346 464/64.1 |
| 2015/0087430 A1* | 3/2015 | Norwich | F16F 15/12353 464/68.9 |
| 2017/0254387 A1* | 9/2017 | Okaji | F16F 15/12353 |

FOREIGN PATENT DOCUMENTS

| | | |
|---|---|---|
| JP | 2017-083004 A | 5/2017 |
| JP | 2017-155831 A | 9/2017 |
| JP | 2017-155832 A | 9/2017 |
| JP | 2019-056461 A | 4/2019 |
| WO | 2014/119685 A1 | 8/2014 |

OTHER PUBLICATIONS

Official Communication dated Apr. 20, 2022 issued in corresponding Japanese Patent Application No. 2019-174745 with the English translation thereof.

Office Action dated Oct. 27, 2021 issued over the corresponding Japanese Patent Application No. 2019-109575.

* cited by examiner

FIG.12

| PRESET | [1] | [2] | [3] |
|---|---|---|---|
| BACKLASH | NO | YES | YES |
|  | NO | NO | YES |

[1] HIGH DAMPING IS OBTAINED AT TARGET ROTATION, BUT THE ROTATION RANGE IS NARROW AND A NECESSARY ROTATIONAL REGION CANNOT BE COVERED.

[2] ROTATIONAL RANGE THAT CAN GIVE HIGH DAMPING IS EXTENDED. HOWEVER, HAS THE PROPERTY OF SHIFTING TO HIGH ROTATION SIDE AS TORQUE DECREASES, AND LOW TORQUE REGION CANNOT BE COVERED.

[3] ROTATIONAL RANGE REMAINS WIDE, SHIFTING OF THE ROTATIONAL REGION CAN BE SUPPRESSED REGARDLESS OF THE TORQUE BEING HIGH OR LOW, AND SUBSTANTIALLY ALL OF THE NECESSARY REGION CAN BE COVERED.

Legend:
- REGION REQUIRING HIGH DAMPING (1000~1500rpm)
- REGION WHERE HIGH DAMPING CAN BE OBTAINED Axes: TORQUE (vertical), ENGINE ROTATIONAL SPEED (horizontal)

POWER TRANSMISSION DEVICE

CROSS REFERENCE TO RELATED APPLICATIONS

The present application claims priority under 35 U.S.C. § 119 to Japanese Patent Applications No. 2019-109575 filed Jun. 12, 2019 and No. 2019-174745 filed Sep. 25, 2019 the entire contents of which are hereby incorporated by reference.

BACKGROUND OF THE INVENTION

Field of the Invention

The present invention relates to a power transmission device, particularly in which a dynamic damper is provided in a power transmission path having at least one damper disposed therein, the dynamic damper has an inertial rotating body that can rotate relative to a transmission rotating member forming part of the power transmission path, and a dynamic damper spring that can provide connection between the transmission rotating member and the inertial rotating body.

Description of the Related Art

There is known an arrangement in which the power transmission device is for example used for power transmission between an output shaft and a clutch piston of a lockup clutch of a torque converter.

A dynamic damper usually provided in such a power transmission device is only able to exhibit a damping effect in a narrow limited input rotation range.

There is already a proposal for a technique for extending the damping region of a dynamic damper by applying a preset load to a dynamic damper spring (see, for example, Japanese Patent Application Laid-open No. 2017-155831).

However, in the power transmission device of Japanese Patent Application Laid-open No. 2017-155831, although the damping region can be extended by applying a preset load to the dynamic damper spring, the damping peak of the damping region varies considerably in response to change in the magnitude of input torque from an engine and, for example, the smaller the torque amplitude of the input torque, the more the damping peak shifts to the engine high rotation side.

That is, since the peak region of the damping effect due to the dynamic damper varies according to the degree to which an accelerator is pressed, it is difficult to always obtain a high damping effect in a target rotation range regardless of the degree to which the accelerator is pressed (that is, the magnitude of the input torque).

SUMMARY OF THE INVENTION

The present invention has been accomplished in light of such circumstances, and it is an object thereof to provide a power transmission device that can solve the problems of the conventional device with a simple structure.

In order to achieve the object, according to a first aspect of the present invention, there is provided a power transmission device in which a dynamic damper is provided in a power transmission path having at least one damper disposed therein, the dynamic damper has an inertial rotating body that can rotate relative to a transmission rotating member forming part of the power transmission path, and a dynamic damper spring that can provide connection between the transmission rotating member and the inertial rotating body, and a preset load is applied to the dynamic damper spring in a non-transmitting state of the power transmission path, wherein the dynamic damper spring is supported on either one of the transmission rotating member and the inertial rotating body so as to apply the preset load to the dynamic damper spring in the non-transmitting state, and a gap is set in a rotational direction in the non-transmitting state between the dynamic damper spring and an other one of the transmission rotating member and the inertial rotating body.

In accordance with the first aspect of the present invention, the dynamic damper spring is supported on either one of the inertial rotating body and the transmission rotating member, which is part of the power transmission path, so as to apply the preset load to the dynamic damper spring in the non-transmitting state, and the gap, that is, backlash, in the rotational direction is set between the other one and the dynamic damper spring in the non-transmitting state. This enables not only the damping region of the dynamic damper to be extended with a simple structure in which the preset load is applied and the gap is added, but also the damping peak of the extended damping region to be prevented from shifting greatly and varying depending on the size of the input torque. As a result, a high performance dynamic damper that can achieve both the function of extending the damping region and the function of suppressing shifting of the damping peak can be obtained, and a high damping effect can be exhibited thereby regardless of the size of the input torque.

According to a second aspect of the present invention, in addition to the first aspect, the gap is set so that when the gap is C [rad], a torque due to the preset load of the dynamic damper spring is $T_p$ [Nm], and a spring stiffness of the dynamic damper spring is k [Nm/rad], $C<T_p/k$ holds.

In accordance with the second aspect, since when the gap is C [rad], the torque due to the preset load is $T_p$ [Nm], and the spring stiffness of the dynamic damper spring is k [Nm/rad], the gap is set so that $C<T_p/k$ holds, it is set so that the smaller the deflection angle of the dynamic damper, the higher the effective spring constant of the dynamic damper spring, and it is possible to reduce variation of the damping peak by means of the gap while sufficiently extending the damping region by the dynamic damper.

According to a third aspect of the present invention, in addition to the first aspect, the gap is set so that when the gap is C [mm] and a preset amount of the dynamic damper spring is Z [mm], 0.1Z<C<0.5Z holds.

In accordance with the third aspect, since when the gap is C [mm] and the preset amount is Z [mm], the gap is set so that 0.1Z<C<0.5Z holds, it is possible to reduce effectively variation of the damping peak while ensuring the effect of the dynamic damper in improving the damping performance.

According to a fourth aspect of the present invention, in addition to the first aspect, either one of the transmission rotating member and the inertial rotating body comprises a spring support part that is engaged so as to solely apply the preset load to the dynamic damper spring in the non-transmitting state, and an other one of the transmission rotating member and the inertial rotating body comprises a pair of spring retaining members that are linked to each other and retain the dynamic damper spring therebetween, the gap being set between the spring retaining members and the dynamic damper spring in the non-transmitting state.

In accordance with the fourth aspect, since either one of the transmission rotating member and the inertial rotating body includes the spring support part, which is engaged so as to solely apply the preset load to the dynamic damper spring in the non-transmitting state, the other one includes the pair of spring retaining members, which are linked to each other and retain the dynamic damper spring therebetween, and the gap is set between the two spring retaining members and the dynamic damper spring in the non-transmitting state, in an assembly process the dynamic damper spring can be provisionally retained by the spring support part while applying the preset load thereto solely with the spring support part, the pair of spring retaining members can easily be assembled in this provisionally retained state, and the ease of assembly of the two spring retaining members is therefore very good.

According to a fifth aspect of the present invention, in addition to the first aspect, either one of the transmission rotating member and the inertial rotating body comprises a pair of spring retaining members that are linked to each other and retain the dynamic damper spring therebetween, the spring retaining members being engaged so as to apply the preset load to the dynamic damper spring in the non-transmitting state, and an other one of the transmission rotating member and the inertial rotating body comprises a spring engagement part that can engage with the dynamic damper spring, the gap being set between the spring engagement part and the dynamic damper spring in the non-transmitting state.

In accordance with the fifth aspect, since either one of the transmission rotating member and the inertial rotating body includes the pair of spring retaining members linked to each other and retaining the dynamic damper spring therebetween, the two spring retaining members engage with the dynamic damper spring in a non-transmitting state so as to apply a preset load thereto, the other one of the transmission rotating member and the inertial rotating body includes the spring engagement part, which can engage with the dynamic damper spring, and the gap is set between the spring engagement part and the dynamic damper spring in the non-transmitting state, it is possible to apply a preset load to the dynamic damper spring in a state in which it is engaged with the pair of spring retaining members, and stabilize the attitude of the spring in the set state. This enables an effect of suppressing shifting of the damping peak to be more reliably achieved.

According to a sixth aspect of the present invention, in addition to the fourth aspect, at least first and second dampers as said damper are disposed in series in the power transmission path, and the transmission rotating member comprising the pair of spring retaining members is disposed in an intermediate portion between the first and second dampers within the power transmission path, the pair of spring retaining members have a spring-holding portion that retains the dynamic damper spring, and retain a damper spring of the second damper via a portion that is different from the spring-holding portion, and the damper spring of the second damper is disposed between the pair of spring retaining members and a member further on a downstream side than the transmission rotating member within the power transmission path.

In accordance with the sixth aspect, since the transmission rotating member, which is equipped with the pair of spring retaining members, is disposed in the intermediate portion between the first and second dampers within the power transmission path, the pair of spring retaining members have the spring-holding portions, which retain the dynamic damper spring, and retain the damper spring of the second damper via a portion that is different from the spring-holding portions, and the damper spring of the second damper is disposed between the pair of spring retaining members and the member further on the downstream side of the transmission rotating member within the power transmission path, it is possible to further improve the damping function in cooperation with the first and second dampers and the dynamic damper. Moreover, the pair of spring retaining members retaining the dynamic damper spring function also as retaining means for the damping spring of the second damper, thus contributing to simplification of the structure.

According to a seventh aspect of the present invention, in addition to the sixth aspect, in a connected state of a lockup clutch in a torque converter, rotational power from an engine is transmitted from the lockup clutch to an output shaft of the torque converter via the power transmission path.

In accordance with the seventh aspect, since the power transmission device transmits rotation of an engine from the lockup clutch in the torque converter to the output shaft side of the torque converter in a state in which the lockup clutch is connected, it is possible to damp effectively vibration caused by rotational variation of the engine when the lockup clutch is operated.

According to an eighth aspect of the present invention, in addition to the seventh aspect, a damper spring of the first damper is disposed between one of the spring retaining members and a clutch piston of the lockup clutch.

In accordance with the eighth aspect, since the damper spring of the first damper is disposed between one spring retaining member and the clutch piston of the lockup clutch, the one spring retaining member involved in retaining the dynamic damper spring functions also as means for engaging with the damper spring of the first damper, and a contribution can be made to simplification of the structure.

According to a ninth aspect of the present invention, in addition to the seventh aspect, a turbine runner of the torque converter is fixed to the output shaft or a member that rotates integrally with the output shaft.

In accordance with the ninth aspect, since the turbine runner is fixed to the output shaft or the member rotating integrally therewith, even when the inertial mass on the output side is small, this can be compensated for by the turbine runner, and the damping performance can be further improved.

According to a tenth aspect of the present invention, in addition to the seventh aspect, the turbine runner of the torque converter is fixed to the transmission rotating member.

In accordance with the tenth aspect, since the turbine runner is fixed to the transmission rotating member, the inertial mass of the transmission rotating member between the pair of dampers can be increased by means of the turbine runner, and the damping performance can be further improved.

According to an eleventh aspect of the present invention, in addition to the seventh aspect, the turbine runner of the torque converter forms at least part of a mass body in the inertial rotating body.

In accordance with the eleventh aspect, since the turbine runner forms at least part of the mass body in the inertial rotating body, a mass body for exclusive use provided on the outer diameter side of the inertial rotating body can be made small or omitted, and a contribution can be made to reducing the size and weight of the dynamic damper.

According to a twelfth aspect of the present invention, in addition to the first aspect, the gap is set at a size that can suppress variation, in response to a change in an input torque, of a damping peak of a damping region of the dynamic damper that is extended based on the preset load being applied.

The above and other objects, characteristics and advantages of the present invention will be clear from detailed descriptions of the preferred embodiments which will be provided below while referring to the attached drawings.

BRIEF DESCRIPTION OF THE DRAWINGS

FIG. 12 is a diagram for explaining in an easily understood manner how a rotational range via which a high damping effect is obtained by application of a preset load and the presence or absence of backlash changes in accordance with the torque magnitude.

DESCRIPTION OF THE PREFERRED EMBODIMENTS

Embodiments of the present invention are explained below by reference to the attached drawings.

Figure 1:
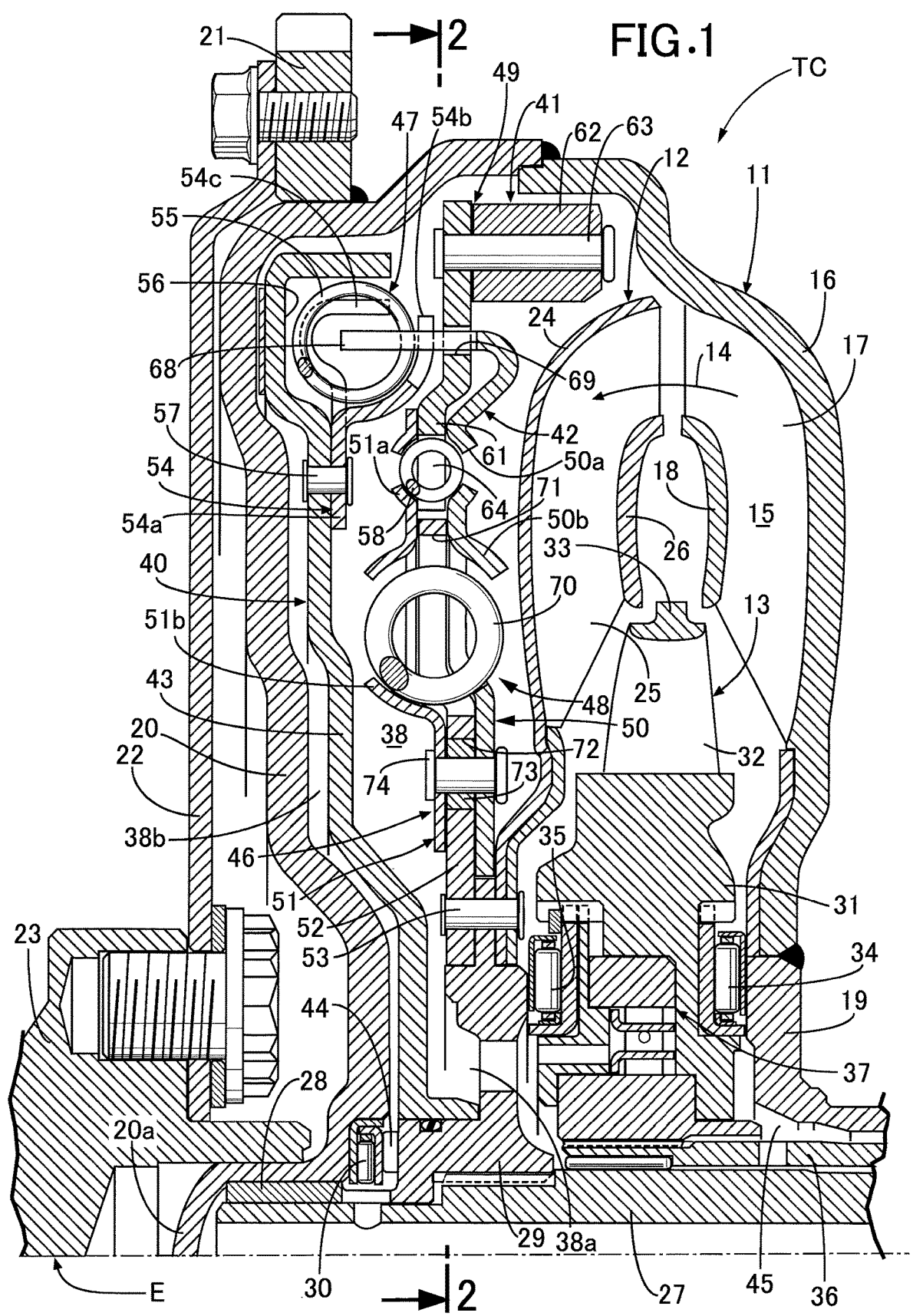
FIG. 1 is a longitudinal sectional view of a torque converter related to a first embodiment of the present invention (sectional view along line 1-1 in FIG. 2).

First, a first embodiment is explained by reference to FIG. 1 to FIG. 5. In FIG. 1, a torque converter TC includes a pump impeller 11, a turbine runner 12 disposed so as to oppose the pump impeller 11, and a stator 13 disposed between inner peripheral parts of the pump impeller 11 and the turbine runner 12, a circulation circuit 15 through which hydraulic oil circulates being formed as shown by an arrow 14 between the pump impeller 11, the turbine runner 12, and the stator 13.

The pump impeller 11 has a bowl-shaped pump shell 16, a plurality of pump blades 17 provided on an inner face of the pump shell 16, a pump core ring 18 linking the pump blades 17, and a pump hub 19 fixed to an inner peripheral part of the pump shell 16 by for example welding, an oil pump (not illustrated) supplying hydraulic oil to the torque converter TC being operatively linked to the pump hub 19.

Furthermore, a bowl-shaped transmission cover 20 covering the turbine runner 12 from the outside is joined by welding to an outer peripheral part of the pump shell 16, a ring gear 21 is fixed by welding to an outer peripheral part of the transmission cover 20, and a drive plate 22 is secured to the ring gear 21. Moreover, a crankshaft 23 of a vehicle engine E is coaxially secured to the drive plate 22, and rotational power is inputted from the vehicle engine E into the pump impeller 11.

The turbine runner 12 has a bowl-shaped turbine shell 24, a plurality of turbine blades 25 provided on an inner face of the turbine shell 24, and a turbine core ring 26 linking the turbine blades 25.

An end part of an output shaft 27 transmitting rotational power from the vehicle engine E to a transmission, which is not illustrated, is supported, via a bearing bush 28, on a bottomed cylindrical support tube portion 20a integrally provided on a center part of the transmission cover 20. The output shaft 27 is spline joined to an output hub 29 disposed at a position spaced in the axial direction from the pump hub 19, and a needle thrust bearing 30 is disposed between the output hub 29 and the transmission cover 20.

The stator 13 has a stator hub 31 disposed between the pump hub 19 and the output hub 29, a plurality of stator blades 32 provided on the outer periphery of the stator hub 31, and a stator core ring 33 linking the outer periphery of the stator blades 32, a thrust bearing 34 is disposed between the pump hub 19 and the stator hub 31, and a thrust bearing 35 is disposed between the output hub 29 and the stator hub 31.

A one-way clutch 37 is disposed between the stator hub 31 and a stator shaft 36 relatively rotatably surrounding the output shaft 27, which rotates together with the output hub 29, and the stator shaft 36 is non-rotatably supported on a transmission case (not illustrated).

A clutch chamber 38 communicating with the circulation circuit 15 is formed between the transmission cover 20 and the turbine shell 24. Housed within the clutch chamber 38 are a lockup clutch 40, an inertial rotating body 41, and a spring holder 42 sandwiching an inner peripheral part of the inertial rotating body 41 from opposite sides while enabling relative rotation with respect to the inertial rotating body 41 over a restricted range.

The lockup clutch 40 has a clutch piston 43 that can be frictionally connected to the transmission cover 20 and can switch between a connected state in which the clutch piston 43 is frictionally connected to the transmission cover 20 and a non-connected state in which the frictional connection is released. An inner peripheral part of the clutch piston 43 formed into a disk shape is slidably supported on the output hub 29 so that it can move in the axial direction.

The interior of the clutch chamber 38 is divided by the clutch piston 43 into an inside chamber 38a on the turbine runner 12 side and an outside chamber 38b on the transmission cover 20 side, an oil groove 44 formed in the output hub 29 so as to be adjacent to the needle thrust bearing 30 communicates with the outside chamber 38b, and the oil groove 44 communicates with the interior of the cylindrical output shaft 27. Furthermore, an oil passage 45 communicating with an inner peripheral part of the circulation circuit 15 is formed between the pump hub 19 and the stator shaft 36. The oil pump and an oil reservoir (not illustrated) are alternately connected to the oil groove 44 and the oil passage 45.

When the vehicle engine E is idling or in a very low speed operating range, hydraulic oil is supplied from the oil groove 44 to the outside chamber 38b, and hydraulic oil is guided out from the oil passage 45; in this state the outside chamber 38b has a higher pressure than that of the inside chamber 38a. The clutch piston 43 is thereby pushed toward the side on which it moves away from an inner face of the transmission cover 20, and the lockup clutch 40 attains a non-connected state. In this state, relative rotation between the pump impeller 11 and the turbine runner 12 is allowed, the pump impeller 11 is rotated by the vehicle engine E, hydraulic oil within the circulation circuit 15 thereby circulates within the circulation circuit 15 as shown by the arrow 14 in sequence from the pump impeller 11 to the turbine runner 12 and then to the stator 13, and the rotational torque of the pump impeller 11 is transmitted to the output shaft 27 via the turbine runner 12 and the output hub 29.

In a state in which there is a torque amplification action between the pump impeller 11 and the turbine runner 12, the accompanying reaction force is borne by the stator 13, and the stator 13 is fixed by the locking function of the one-way clutch 37. Furthermore, when the torque amplification action is completed, the stator 13 rotates together with the pump impeller 11 and the turbine runner 12 in the same direction while making the one-way clutch 37 idle due to the direction of the torque that the stator 13 receives being reversed.

When such a torque converter TC attains a coupled state or a nearly coupled state, the connected states between the oil groove 44 and oil passage 45 and the oil pump and oil reservoir are switched over so that hydraulic oil is supplied from the oil passage 45 to the inside chamber 38a and hydraulic oil is guided out from the oil groove 44. As a result, the inside chamber 38a of the clutch chamber 38 has a higher pressure than that of the outside chamber 38b, the difference in pressure pushes the clutch piston 43 toward the transmission cover 20 side, an outer peripheral part of the clutch piston 43 is pressed against the inner face of the transmission cover 20 and is frictionally connected to the transmission cover 20, and the lockup clutch 40 thus attains a connected state.

When the lockup clutch 40 has attained the connected state, the torque transmitted from the vehicle engine E to the transmission cover 20 is mechanically transmitted to the output shaft 27 via a torque transmission path 46 as a power transmission path, which includes the clutch piston 43 rotating together with the pump impeller 11 while forming part of the lockup clutch 40, the spring holder 42, and the output hub 29. Disposed in the torque transmission path 46 is at least one damper, in this embodiment first and second dampers 47, 48, and added thereto is a dynamic damper 49.

The clutch piston 43 and the output shaft 27 are examples of one and another rotating bodies between which the torque transmission path 46 as a power transmission path is disposed, and the spring holder 42 is one example of a transmission rotating member.

In the present embodiment, the spring holder 42 is formed by linking relatively non-rotatably to each other a pair of retaining plates 50, 51 that are disposed across a gap in the axial direction of the output shaft 27 and disposed coaxially with the output hub 29. An inner peripheral part of a ring plate-shaped driven plate 52 sandwiched between the pair of retaining plates 50, 51, which has part protruding in the radially inward direction from the retaining plates 50, 51 and which forms part of the torque transmission path 46, and an inner peripheral part of the turbine shell 24 of the turbine runner 12 are fixed to the output hub 29 by means of a plurality of first rivets 53 so as to rotate together with the output hub 29.

The first damper 47 is formed by disposing between the clutch piston 43 and the spring holder 42 a plurality of first damper springs 55, which have a coil shape, are retained by the clutch piston 43, and are disposed at equal intervals in the peripheral direction.

An annular housing recess part 56 is formed in a face, on the side opposite to the transmission cover 20, of an outer peripheral part of the clutch piston 43, and a spring retaining member 54 retaining the first damper springs 55, which are housed within the housing recess part 56 at equal intervals in the peripheral direction, between itself and the clutch piston 43 is fixed to the clutch piston 43.

The spring retaining member 54 is formed so as to integrally have a ring plate portion 54a disposed coaxially with the clutch piston 43 while having an outer periphery substantially corresponding to the inner periphery of the housing recess part 56, a spring cover portion 54b formed into an arc-shaped cross section covering the inside of the first damper spring 55 along the radial direction of the clutch piston 43, connected to four positions, equally spaced in the peripheral direction, of the outer periphery of the ring plate portion 54a, and formed lengthwise along the peripheral direction of the clutch piston 43, and a spring abutment portion 54c disposed between the spring cover portions 54b and connected to the outer periphery of the ring plate portion 54a so as to project further outward in the radial direction than the spring cover portion 54b, the ring plate portion 54a being fixed to the clutch piston 43 by means of a plurality of second rivets 57.

The spring abutment portion 54c is disposed between a plurality of the first damper springs 55. When the lockup clutch 40 is in a non-connected state, the spring abutment portion 54c abuts against end parts of the first damper springs 55 on opposite sides thereof.

Figure 2:
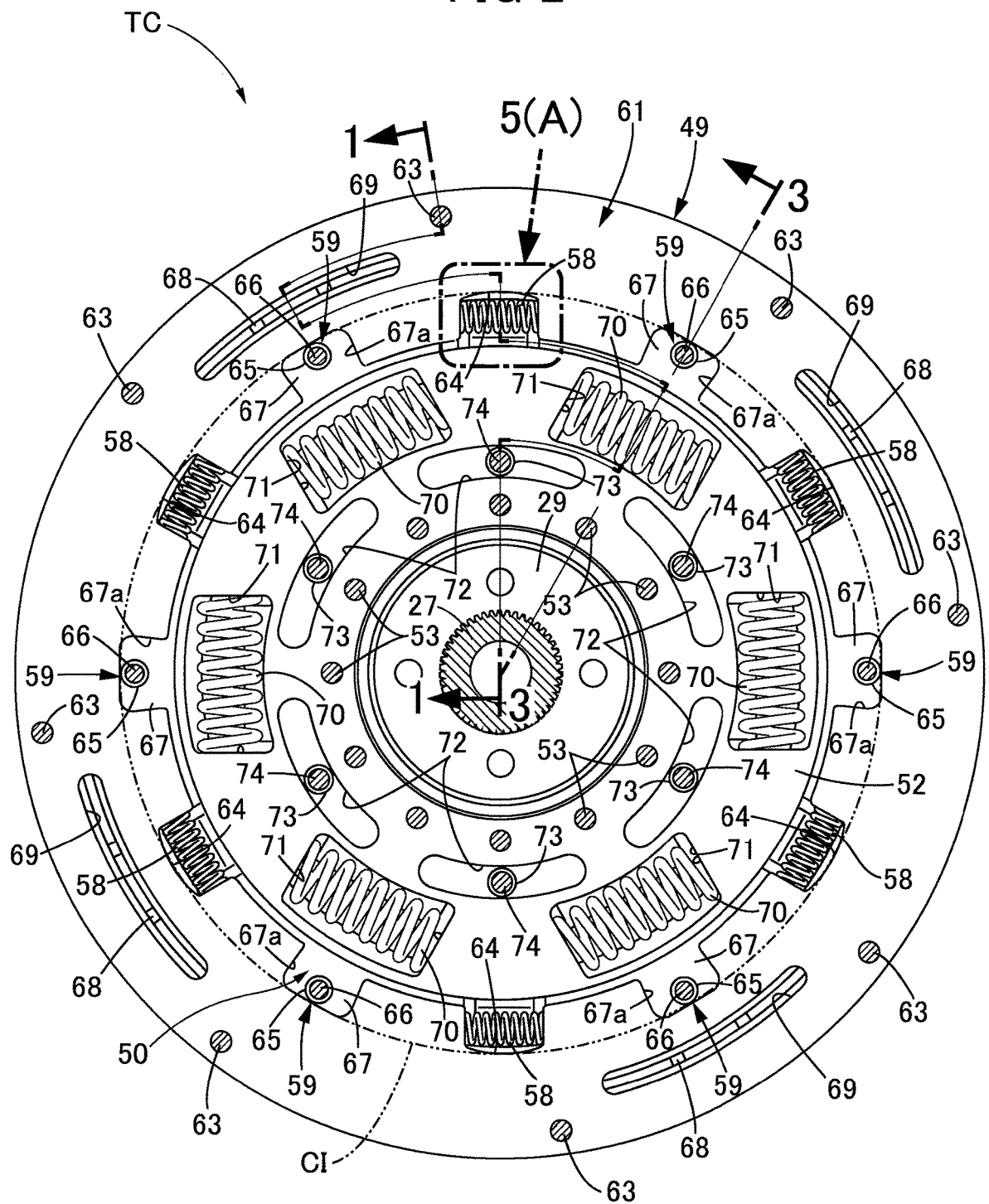
FIG. 2 is an enlarged sectional view along line 2-2 in FIG. 1.
Figure 3:
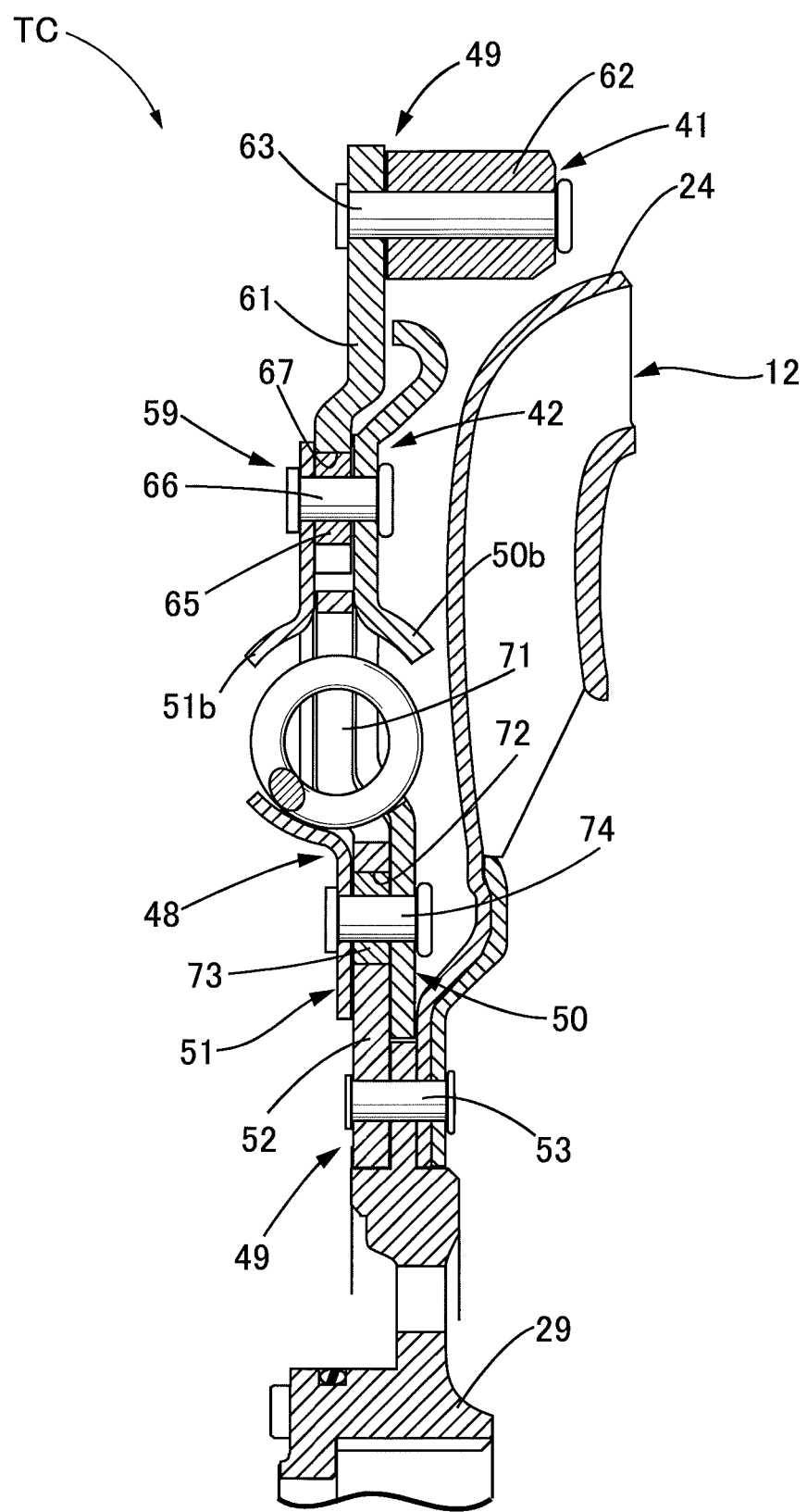
FIG. 3 is an enlarged sectional view of an essential part along line 3-3 in FIG. 2.
Figure 4:
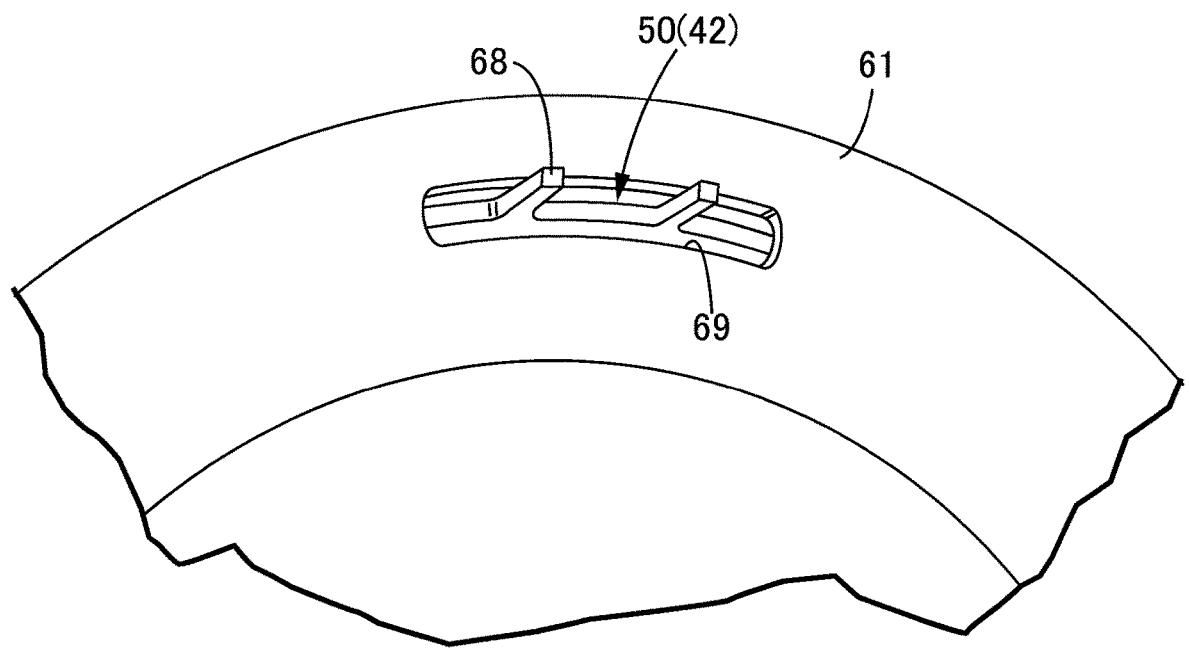
FIG. 4 is a perspective view showing a claw part inserted into an elongated hole of an inertia plate.

Referring in addition to FIG. 2 and FIG. 3, the dynamic damper 49 includes the spring holder 42, the inertial rotating body 41, a plurality of, for example six, coil-shaped dynamic damper springs 58 as elastic members disposed between the spring holder 42 and the inertial rotating body 41, and a plurality of, for example six, linking means 59 relatively non-rotatably linking the pair of retaining plates 50, 51 forming the spring holder 42.

The inertial rotating body 41 includes a ring plate-shaped inertia plate 61 sandwiched between outer peripheral parts of the pair of retaining plates 50, 51, and a ring-shaped weight member 62 fixed to the inertia plate 61 by means of a plurality of third rivets 63. The inertia plate 61 is formed so that its outer peripheral part projects further in the radially outward direction than the pair of retaining plates 50, 51, and the weight member 62 is fixed to the outer peripheral part of the inertia plate 61. Furthermore, the dynamic damper spring 58 is retained by the pair of retaining plates 50, 51 functioning as spring retaining members and is disposed between the pair of retaining plates 50, 51 and the inertia plate 61, which forms part of the inertial rotating body 41.

Spring-holding portions 50a and 51a for retaining the dynamic damper spring 58 are formed at a plurality of, for example six, locations equally spaced in the peripheral direction of the pair of retaining plates 50, 51, part of a side face of the dynamic damper spring 58 facing the exterior. The spring-holding portions 50a, 51a are formed by for example providing an H-shaped slit hole in a position of each of the retaining plates 50, 51 where the dynamic damper spring 58 is to be disposed, and punching upward part of the peripheral side of the slit hole. More specifically, the spring-holding portions 50a, 51a include spring barrel support portions 50as, 51as formed by punching upward a peripheral side part on the inner and outer sides in the radial direction (downward and upward in FIG. 5) of the slit hole so as to each open outward in the axial direction of the output shaft 27, and respective pairs of spring end support portions 50ae, 51ae formed from peripheral edges on one and the other sides in the peripheral direction (leftward and rightward in FIG. 5) of the slit hole.

On the other hand, an elastic member-housing recess 64 housing the dynamic damper spring 58 is formed in an inner peripheral portion, corresponding to the spring-holding portions 50a, 51a, of the inertia plate 61 so that the elastic member-housing recess 64 opens on an inner peripheral part of the inertia plate 61. The elastic member-housing recess part 64 is one example of a spring support part of the present invention that can be engaged so as to solely apply a predetermined preset load to the dynamic damper spring 58.

When the lockup clutch 40 is in a non-connected state (that is, the torque transmission path 46 is in a non-transmitting state), opposite end parts 64a of the elastic member-housing recess part 64 each abut against opposite end parts of the dynamic damper spring 58 in the peripheral direction of the inertia plate 61 in a state in which the dynamic damper spring 58 is compressed (that is, a state in which a predetermined preset load, that is, a preliminary pressure, is applied to the dynamic damper spring 58), whereas in the non-transmitting state, backlash, that is, a predetermined gap C in the rotational direction, is set between the spring end support portions 50ae, 51ae of the pair of retaining plates 50, 51 and the opposite end parts of the dynamic damper spring 58.

In this case, when the length between the opposite end parts 64a of the elastic member-housing recess part 64 in the peripheral direction of the inertia plate 61 is a, the length between the each pair of spring end support portions 50ae, 51ae of each of the retaining plates 50, 51 is b, and the length of the dynamic damper spring 58 in a free state is s, the lengths a, b, s are set so that the relationship s>b>a holds.

Furthermore, as described later, when the gap is C [rad], the torque due to a preset load of the dynamic damper spring 58 is $T_p$ [Nm], and the spring stiffness of the dynamic damper spring 58 is k [Nm/rad], the gap C is set that $C<T_p/k$ holds.

Figure 5:
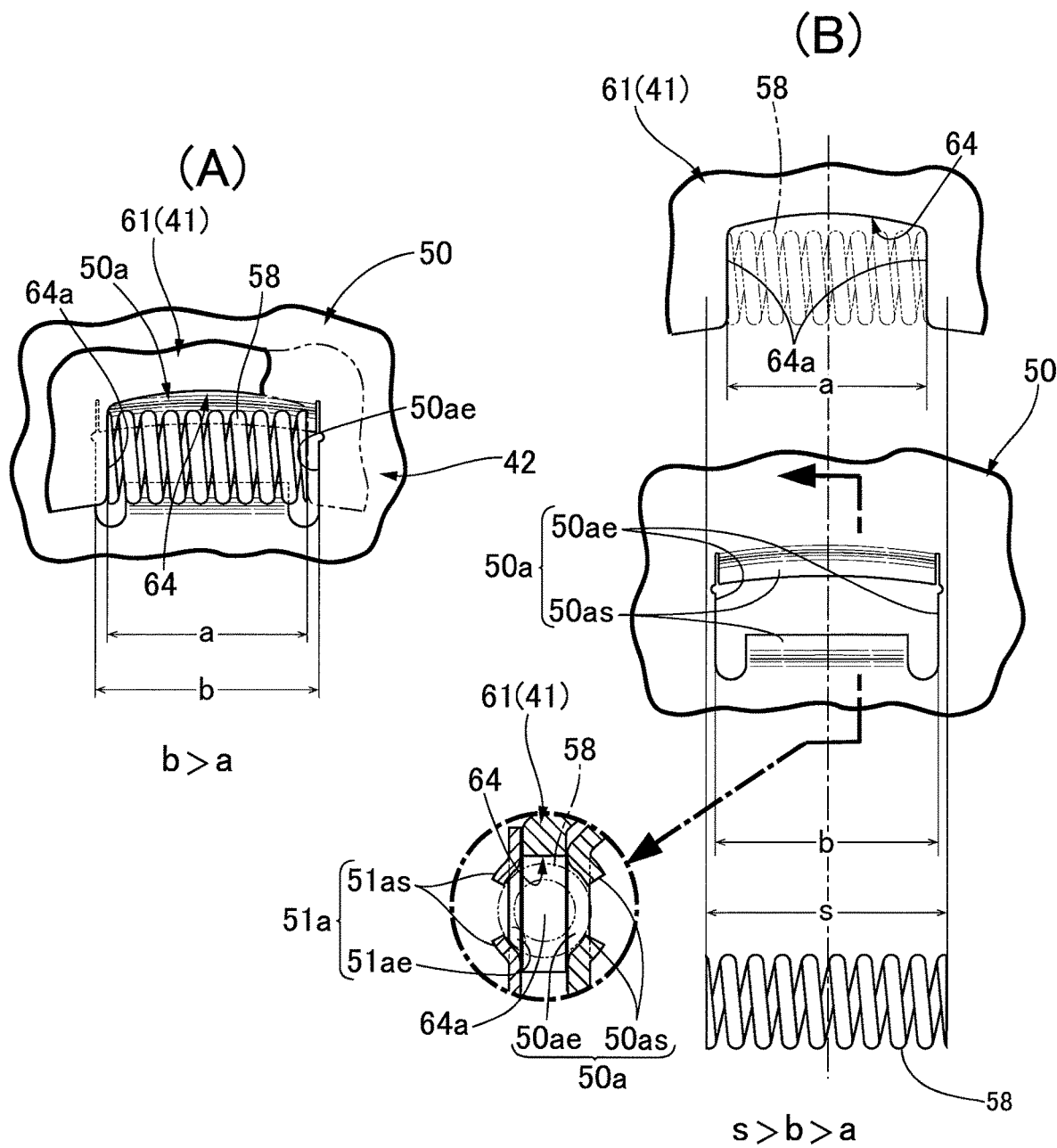
FIG. 5 illustrates views showing the support structure for a dynamic damper spring; (A) is a partially cutout enlarged view of a part shown by arrow 5(A) in FIG. 2 and (B) is an exploded view corresponding to FIG. 5 (A) and a transverse sectional view of part thereof.

Moreover, when the gap is C [mm] (that is, corresponding to (b-a) in FIG. 5), and a compression length at the time of presetting the dynamic damper spring 58, that is, the preset amount (that is, corresponding to (s-a) in FIG. 5) is Z [mm], it is desirable to set the gap C so that 0.1Z<C<0.5Z holds, for reasons described later.

The linking means 59 relatively non-rotatably linking the pair of retaining plates 50, 51 is formed from a cylindrical first spacer 65 disposed between the retaining plates 50, 51, and a fourth rivet 66 extending through the first spacer 65 so as to relatively non-rotatably link the pair of retaining plates 50, 51. On the other hand, a plurality of linking means-housing recesses 67 are formed in an inner peripheral part of the inertia plate 61 so as to be disposed between the elastic member-housing recesses 64 in the peripheral direction of the inertia plate 61 and open on the inner periphery of the inertia plate 61, the linking means-housing recess 67 housing the linking means 59 while allowing relative rotation between the inertia plate 61 and the pair of retaining plates 50, 51.

The linking means-housing recess part 67 and the elastic member-housing recess part 64 are formed into an arc shape so as to make their outer peripheral edges follow the same imaginary circle CI (see FIG. 2) having its center on the axis of the output shaft 27.

Furthermore, a stopper portion 67a is formed on opposite end parts of the linking means-housing recess part 67 along the peripheral direction of the inertia plate 61, the stopper portion 67a abutting against the spacer 65 of the linking means 59 to thus restrict the limit of relative rotation between the inertia plate 61 and the pair of retaining plates 50, 51. Since the limit of relative rotation between the inertia plate 61 and the pair of retaining plates 50, 51 is restricted by abutting the linking means 59 against the stopper portion 67a, it is possible to prevent an excessive load from acting on the dynamic damper spring 58, thus increasing the lifespan of the dynamic damper spring 58.

Moreover, the linking means 59 and the outer peripheral edge of the linking means-housing recess part 67 are disposed so as to be close to or abut against each other in the radial direction of the inertia plate 61 in order to carry out positioning in the radial direction of the inertia plate 61 with respect to the pair of retaining plates 50, 51. It is therefore possible to determine the relative positions along the radial direction of the pair of retaining plates 50, 51 and the inertia plate 61 without increasing the number of components.

The first damper spring 55 of the first damper 47 is disposed between the spring abutment portion 54c of the spring retaining member 54 fixed to the clutch piston 43 and one of the pair of retaining plates 50, 51 forming the spring holder 42, in this embodiment the retaining plate 50, which is on the side opposite to the clutch piston 43. A plurality of claw parts 68 are provided integrally with the retaining plate 50, the plurality of claw parts 68 engaging with the plurality of respective first damper springs 55 so as to sandwich the first damper spring 55 between themselves and the spring abutment portion 54c of the spring retaining member 54.

Furthermore, an elongated hole 69 is formed in the inertia plate 61, the elongated hole 69 extending lengthwise in the peripheral direction of the inertia plate 61 while having inserted therethrough the claw part 68, which is formed into a bifurcate shape. In this embodiment, an outer peripheral part of the retaining plate 50 is bent and formed so as to protrude toward the side opposite to the first damper spring 55, and the same number of claw parts 68 as there are first damper springs 55 are provided integrally with the retaining plate 50 so as to extend in a direction along the axis of the output shaft 27 from the bent part on the outer periphery of the retaining plate 50.

The second damper 48 is disposed between the pair of retaining plates 50, 51 and the driven plate 52, which rotates together with the output shaft 27, and a plurality, for example six, of the second damper springs 70 that form part of the second damper 48 are retained between the pair of retaining plates 50, 51. The driven plate 52 is one example of a member further on the downstream side than the spring holder 42 as a transmission rotating member.

Spring-holding portions 50b and 51b for retaining the second damper spring 70 are formed at a plurality of, for example six, locations equally spaced in the peripheral direction of the pair of retaining plates 50, 51 so that part of the second damper spring 70 faces the exterior. On the other hand, a spring housing hole 71 housing the second damper spring 70 is formed in an inner peripheral part, corresponding to the spring-holding portions 50b and 51b, of the driven plate 52.

A cylindrical second spacer 73 is disposed between the pair of retaining plates 50, 51 on the inner side of the spring housing hole 71 along the radial direction of the pair of retaining plates 50, 51, the cylindrical second spacer 73 being inserted respectively through elongated holes 72 that are provided at a plurality of, for example six, locations equally spaced in the peripheral direction of the driven plate 52 and extending lengthwise in the peripheral direction. The pair of retaining plates 50, 51 are linked by a plurality of fifth rivets 74 each extending through the second spacer 73. That is, the driven plate 52 can rotate relative to the spring holder 42 over a restricted range through which the second spacer 73 moves within the elongated hole 72.

The operation of the first embodiment is now explained by referring in addition to FIG. 6 to FIG. 12.

In the torque converter TC, when the lockup clutch 40 attains a connected state, as described above, the torque transmitted from the vehicle engine E to the transmission cover 20 is mechanically transmitted to the output shaft 27 via the torque transmission path 46, which includes the clutch piston 43 of the lockup clutch 40, the spring holder 42 (transmission rotating member), and the output hub 29. In this process, vibration due to rotational variation of the engine is damped and suppressed by the two dampers 47, 48 and the dynamic damper 49. In this case, in the dynamic damper 49 in particular, since the inertial rotating body 41 vibrates accompanying elastic deformation of the dynamic damper spring 58 and can instead absorb the vibrational energy of the torque transmission path 46 (that is, the main vibration system excluding the dynamic damper 49), the damping effect on vibration of the main vibration system is particularly enhanced in the vicinity of a damping peak rotational speed corresponding to the natural frequency of the dynamic damper 49 (that is, an auxiliary vibration system).

It is known that, when the spring constant of the dynamic damper spring 58 is k [Nm/rad] and the inertia (inertia moment) of the inertial rotating body 41 is I [kgm²], the damping peak rotational speed $Ne_P$ [rpm] of the dynamic damper 49 is given by the following equation.

$$Ne_P = A\sqrt{k/I} \quad (1)$$

Figure 6:
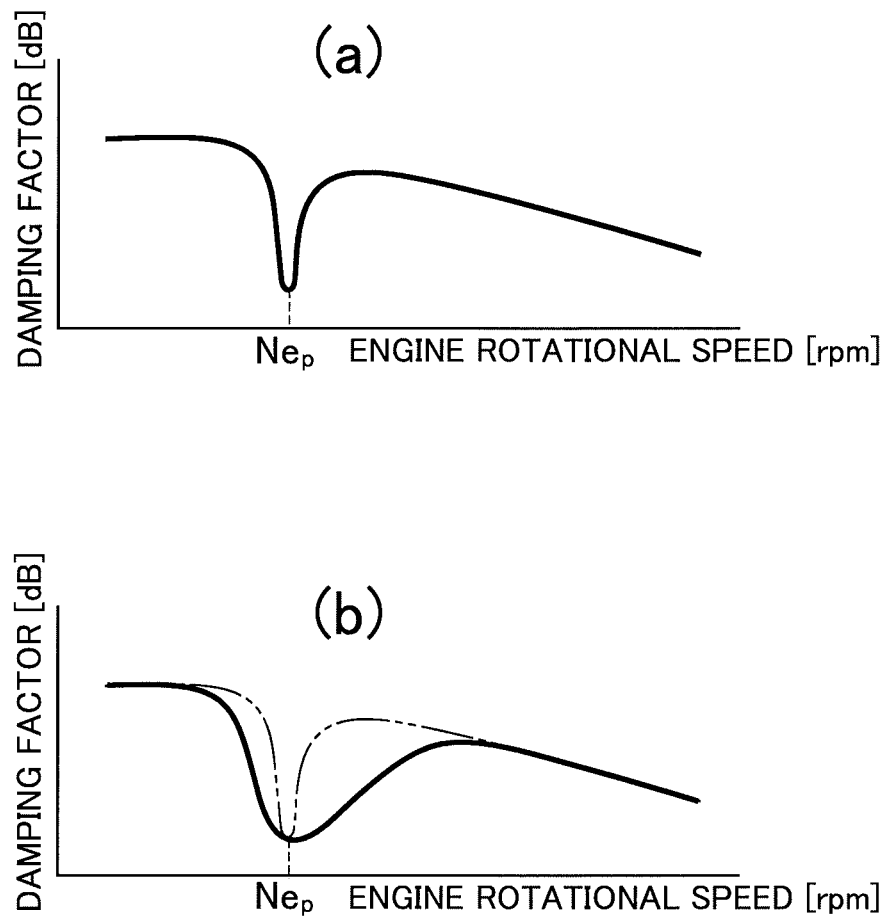
FIG. 6 illustrates graphs showing one example of damping characteristics of a dynamic damper; (a) shows a case in which a preset load is not applied to a dynamic damper spring and (b) shows a case in which a preset load is applied and there is no backlash.

In this case, since A is 60/(2π×engine order), that is, a constant, the damping peak rotational speed $Ne_P$ is determined from the spring constant k and the inertia I. In a graph in which the abscissa is engine rotational speed [rpm] and the ordinate is vibration damping factor [dB], one example of the damping effect by the dynamic damper 49 is shown in for example FIG. 6. In FIG. 6, the lower the vibration damping factor [dB] in the ordinate, the larger the damping effect.

The solid line of FIG. 6(a) is one example where a preset load is not applied to the dynamic damper spring 58, and the solid line of FIG. 6(b) is one example where a preset load is applied when a relatively large torque is inputted. Rather than the former case, in the latter case a damping region via which a high damping effect can be exhibited is extended, and the reasons therefore are now explained.

That is, a vibration frequency f of a main vibration system that is vibrated by receiving rotational power from the engine (hereinafter, simply called an excitation frequency) is known to increase substantially proportionally to an increase in the engine rotational speed, whereas the damping peak rotational speed $Ne_P$ of the dynamic damper 49 is, as is clear from Equation (1), dependent only on the spring constant k and the inertia I and, as long as these are unchanged, is constant regardless of the engine rotational speed. Furthermore, when the torque amplitude of an input torque T to the dynamic damper 49 is Tw, a deflection angle θ [rad] of the dynamic damper 49 is known to be given by the following equation. The torque amplitude Tw is substantially proportional to the input torque.

$$\theta = Tw/(4\pi^2 \cdot I \cdot f^2) \quad (2)$$

Figure 7:
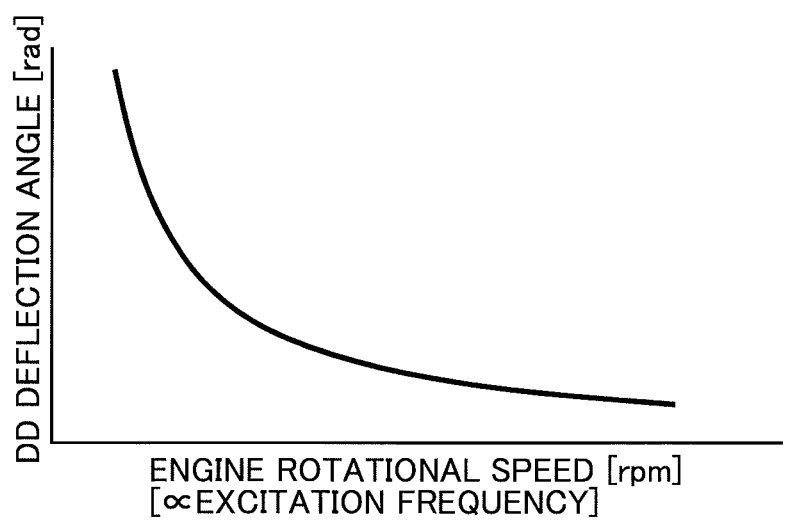
FIG. 7 is a graph showing one example of the relationship between deflection angle of the dynamic damper and engine rotational speed.

In accordance with Equation (2), if the torque amplitude Tw is constant, the deflection angle θ changes as shown in FIG. 7 so as to decrease in the manner of a quadratic function accompanying an increase in the excitation frequency f (and, therefore, an increase in the engine rotational speed, which is substantially proportional to the excitation frequency f).

Figure 8:
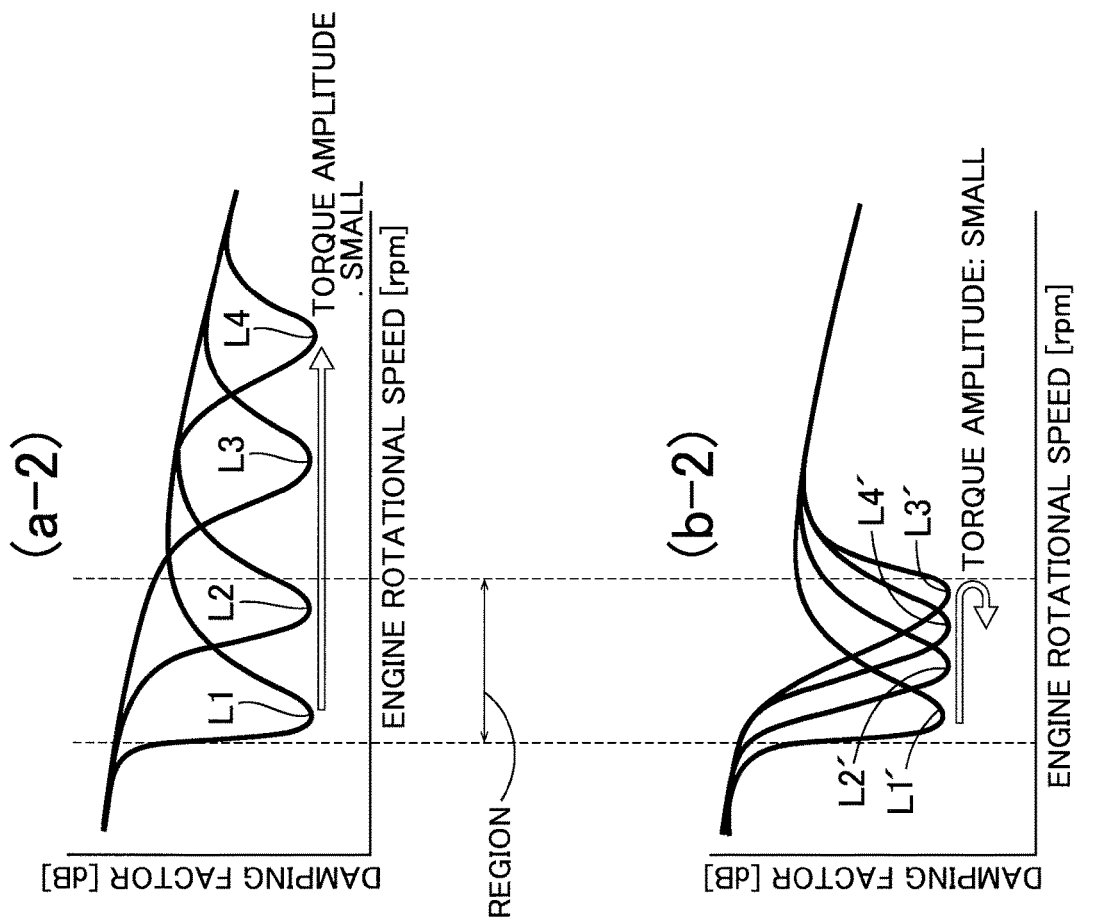
In FIGS. 8, (a-1) and (a-2) show a case in which a preset load is applied to the dynamic damper spring and there is no backlash; (a-1) shows spring characteristics of the dynamic damper and (a-2) shows damping characteristics that change in particular in accordance with the magnitude of torque amplitude. (b-1) and (b-2) show a case in which a preset load is applied to the dynamic damper spring and there is backlash, and correspond to (a-1) and (a-2) respectively.
Figure 9:
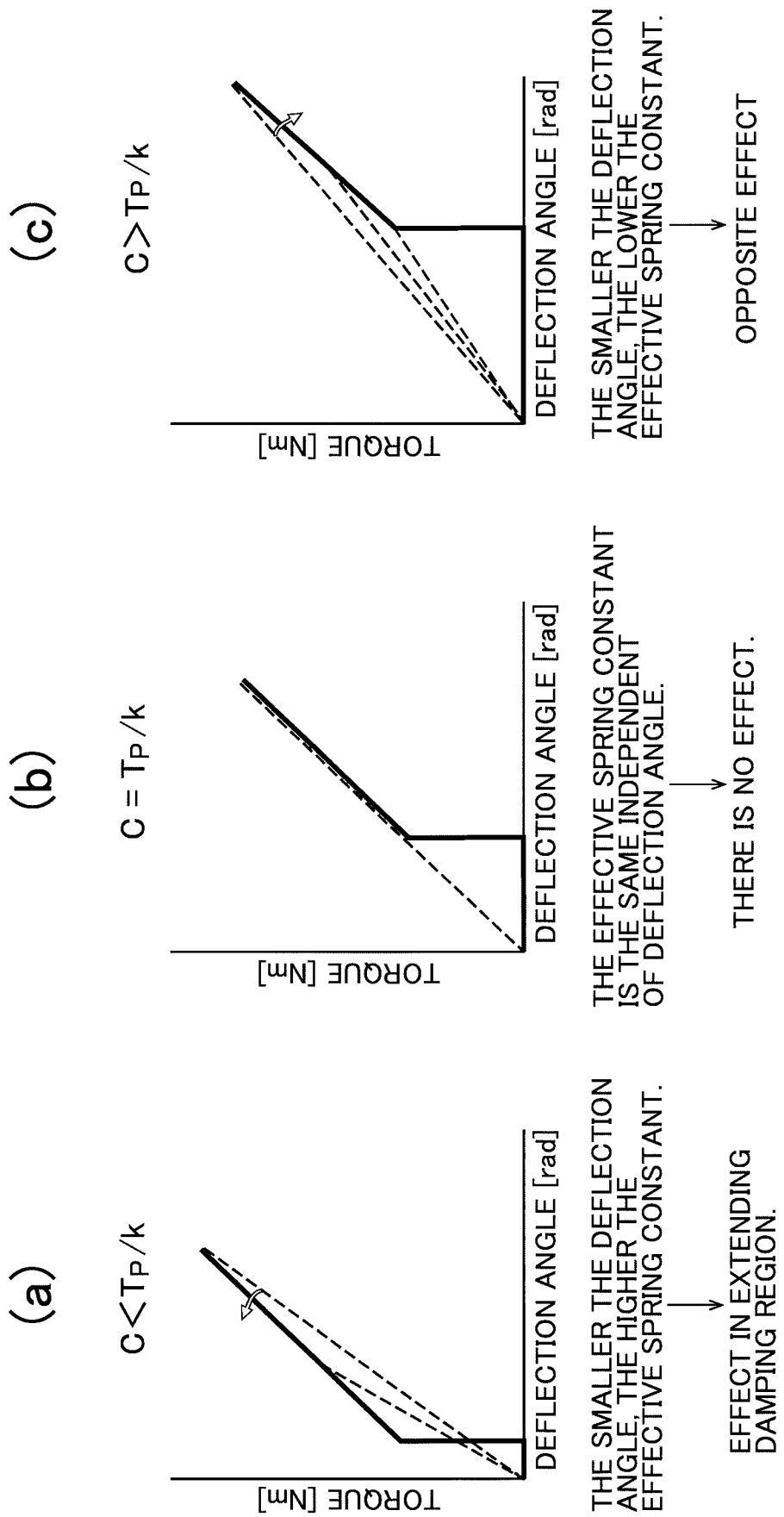
FIG. 9 is a spring plot showing one example of how the effective spring constant of the dynamic damper spring changes in accordance with the relationship in magnitude between backlash C and $T_p/k$.

Furthermore, FIG. 8(a-1) is a graph showing one example of the spring characteristics of the dynamic damper 49 when a torque $T_p$ [Nm] due to a preset load is applied to the dynamic damper spring 58; the abscissa is the deflection angle θ [rad] of the dynamic damper 49, and the ordinate is the input torque T [Nm]. In this case, when the spring constant of the dynamic damper spring 58 is k, the effective spring constant (that is, the apparent spring constant when a preset load is applied) k' is given by the following equation.

$$k' = k + T_p/\theta \quad (3)$$

That is, the effective spring constant k' corresponds to the gradient of an imaginary straight line joining the origin and each plot point p1 to p4 of the graph of FIG. 8(a-1), and it can be seen from the gradient that the smaller the deflection angle θ, the larger the effective spring constant k'.

In this way, the smaller the deflection angle θ, the larger the effective spring constant k', whereas as described above the deflection angle θ decreases in the manner of a quadratic function accompanying an increase in the engine rotational speed (see FIG. 7) and, therefore, the tendency is that the smaller the deflection angle θ (that is, the higher the engine rotational speed), the larger the effective spring constant k'. Therefore, the larger the effective spring constant k', the more toward the high rotation side the damping peak rotational speed $Ne_P$ of the dynamic damper 49 calculated by Equation (1) using this effective spring constant k' occurs.

As a result, the damping region can be extended further by applying a preset load to the dynamic damper spring 58 than by not applying it.

As in Japanese Patent Application Laid-open No. 2017-155831, if a preset load is simply applied to the dynamic damper spring 58, the smaller the torque amplitude Tw, the greater the degree to which the damping peak is shifted to the high rotation side, and there is the problem that a high damping effect cannot be obtained in a target rotation region (for example, 1000 to 1500 rpm in an automobile engine, which is the usual rotation region).

That is, as is clear from Equation (2) the deflection angle θ [rad] of the dynamic damper 49 is a function of the torque amplitude Tw, the effective spring constant k' varies according to the size of the torque amplitude Tw, and accompanying this variation the damping peak rotational speed $Ne_P$ also varies. Because of this, for example, the smaller the torque amplitude Tw, the smaller the deflection angle θ and the larger the effective spring constant k', thus making the damping peak rotational speed $Ne_P$ diverge toward the high rotation side and thereby causing the above problem. The manner of divergence is also clear from the correlation graph between vibration damping factor and engine rotational speed as illustrated in FIG. 8(a-2), and lines L1 to L4 in this figure show one example in which when the apparent spring constant k' corresponding to each of plot points p1 to p4 of FIG. 8(a-1) increases further in response to the torque amplitude Tw decreasing, the damping peak rotational speed $Ne_P$ is shifted greatly to the high rotation side.

On the other hand, in the present embodiment, the dynamic damper spring 58 is supported on either one of the spring holder 42 and the inertial rotating body 41 (in the first embodiment the inertia plate 61 of the inertial rotating body 41) so as to apply a preset load, that is, a preliminary pressure, to the dynamic damper spring 58 and the backlash, that is, the gap C in the rotational direction, is set between the other one (in the first embodiment the spring retaining plates 50, 51 of the spring holder 42) and the dynamic damper spring 58. This makes it possible not only to extend the damping region of the dynamic damper 49, but also to suppress effectively shifting of the damping peak of the extended damping region due to the size of the torque amplitude Tw (and therefore the input torque). The reason why the effect is obtained is now explained.

FIG. 8(b-1) shows one example of the spring characteristics of the dynamic damper spring 58 when the gap C is specially provided, and due to the gap C being specially provided, the effective spring constant k' is the gradient of an imaginary straight line joining the origin and each of plot points p1' to p4' of FIG. 8(b-1). FIG. 8(b-2) shows one example of the correlation between vibration damping factor and input rotational speed when the gap C is specially provided, and lines L1' to L4' in this figure show how the damping peak rotational speed $Ne_P$ varies when the apparent spring constant k' corresponding to each of plot points p1' to p4' increases further in response to the torque amplitude Tw becoming small.

As is clear from FIG. 8(b-1) also, in the present embodiment, the smaller the deflection angle θ (that is, the larger the engine rotational speed) when the torque amplitude Tw becomes small, the larger the effective spring constant k', but when due to the gap C being specially provided the deflection angle θ becomes smaller than a deflection angle corresponding to the gap C, the effective spring constant k' turns and starts decreasing. When the torque amplitude Tw thereby becomes small, the damping peak rotational speed $Ne_P$ first moves to the high rotation side as shown in FIG. 8(b-2) and then reverses to the low rotation side and converges. Therefore, an effect of reducing variation of the damping peak due to the size of the torque amplitude Tw can be obtained.

This effect is limited only to a case in which the gap C [rad], the torque $T_p$ [Nm] due to a preset load, and the spring constant k [Nm/rad] of the dynamic damper spring 49 satisfy Conditional Expression (4) $C<T_p/k$. One example of the spring characteristics of the dynamic damper spring 58 in this case is shown in FIG. 9(a), one example of the spring characteristics when $C=T_p/k$ holds is shown in FIG. 9(b), and one example of the spring characteristics when $C>T_p/k$ holds is shown in FIG. 9(c).

In the case of FIG. 9(a), the smaller the deflection angle θ, the larger the effective spring constant k' (that is, the gradient of the dotted line), and there is an effect in extending the damping region, whereas in the case of FIG. 9(b), the effective spring constant k' is the same regardless of the deflection angle θ and an effect in extending the damping region cannot be obtained, and in the case of FIG. 9(c), since the smaller the deflection angle θ, the more the effective spring constant k' decreases, it can be seen that an effect in extending the damping region cannot be expected either.

That is, even if the gap C is specially provided in order to reduce variation in the damping peak, unless the gap C satisfies the conditions of Expression (4) (in other words, it is set so that the smaller the deflection angle θ, the higher the effective spring constant k'), the damping region due to the dynamic damper 49 cannot be sufficiently extended and, therefore, an effect in improving the damping performance by the dynamic damper 49 cannot be ensured.

As explained above, an effect in extending the damping region of the dynamic damper 49 is obtained by applying a preset load to the dynamic damper spring 58, and due to the gap C being specially provided in addition to a preset load being applied, an effect in suppressing shifting of the extended damping region depending on the size of the torque amplitude Tw is obtained, and the phenomenon is clear from the explanation below.

Figure 10:
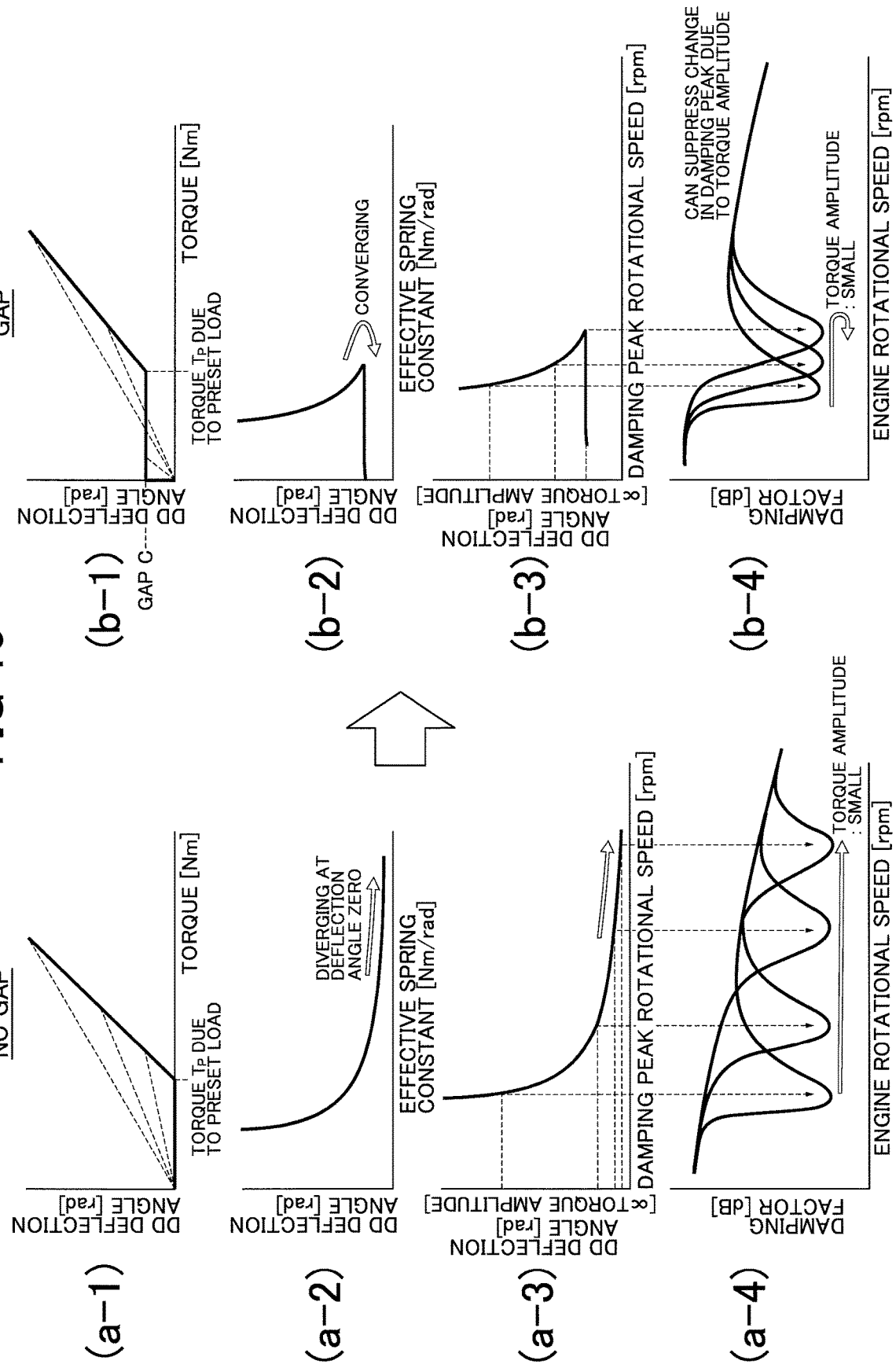
In FIG. 10, (a-1) to (a-4) show a case in which a preset load is applied to the dynamic damper spring but there is no backlash; (a-1) shows spring characteristics of the dynamic damper, (a-2) shows the relationship between deflection angle and effective spring constant, (a-3) shows the relationship between deflection angle and damping peak rotational speed, and (a-4) shows damping characteristics. (b-1) to (b-4) show a case in which a preset load is applied to the dynamic damper spring and there is backlash and correspond to (a-1) to (a-4) respectively.

First, the characteristics of the dynamic damper spring 58 when only a preset load is applied are given as shown in for example FIG. 10(a-1) by a graph in which the ordinate is the deflection angle θ of the dynamic damper 49 and the abscissa is the input torque T. The graph of FIG. 10(a-2) showing the correlation between the deflection angle θ and the effective spring constant k' is formed by plotting the effective spring constant k' with respect to deflection angle θ from the spring characteristics, and in this graph the effective spring constant k' diverges as the deflection angle θ goes near to zero. Subsequently, FIG. 10(a-3), in which the abscissa of FIG. 10(a-2) is converted to the damping peak rotational speed $Ne_P$, is formed based on Equation (1) and the correlation between the deflection angle θ and the effective spring constant k' shown in FIG. 10(a-2). Since FIG. 10(a-3) shows the correlation between the deflection angle θ and the damping peak rotational speed $Ne_P$, it can be seen, from the damping plot of FIG. 10(a-4) formed based on the distribution of the damping peak rotational speed $Ne_P$ obtained from the correlation line, that the smaller the torque amplitude Tw, the further to the high rotation side the damping peak rotational speed $Ne_P$ occurs (that is, it is shifted greatly toward the high rotation side).

On the other hand, the characteristics of the dynamic damper spring 58 when a preset load is applied and the gap C is provided are, as shown in for example FIG. 10(b-1), given by a graph in which the ordinate is the deflection angle θ of the dynamic damper 49 and the abscissa is the input torque T. The graph of FIG. 10(*b*-2) showing the correlation between the deflection angle θ and the effective spring constant k' is formed by plotting the effective spring constant k' with respect to deflection angle θ from the spring characteristics, and in this graph the effective spring constant k' converges before the deflection angle θ becomes close to zero. Subsequently, FIG. 10(*b*-3), in which the abscissa of FIG. 10(*b*-2) is converted to the damping peak rotational speed $Ne_P$, is formed based on Equation (1) and the correlation between the deflection angle θ and the effective spring constant k' shown in FIG. 10(*b*-2). Since FIG. 10(*b*-3) shows a correlation between the deflection angle θ and the damping peak rotational speed $Ne_P$, it can be seen, from the damping plot of FIG. 10(*b*-4) formed based on the distribution of the damping peak rotational speed $Ne_P$ obtained from the correlation line, that even when the torque amplitude Tw becomes small, a large shift of the damping peak rotational speed $Ne_P$ to the high rotation side can be suppressed.

Figure 11:
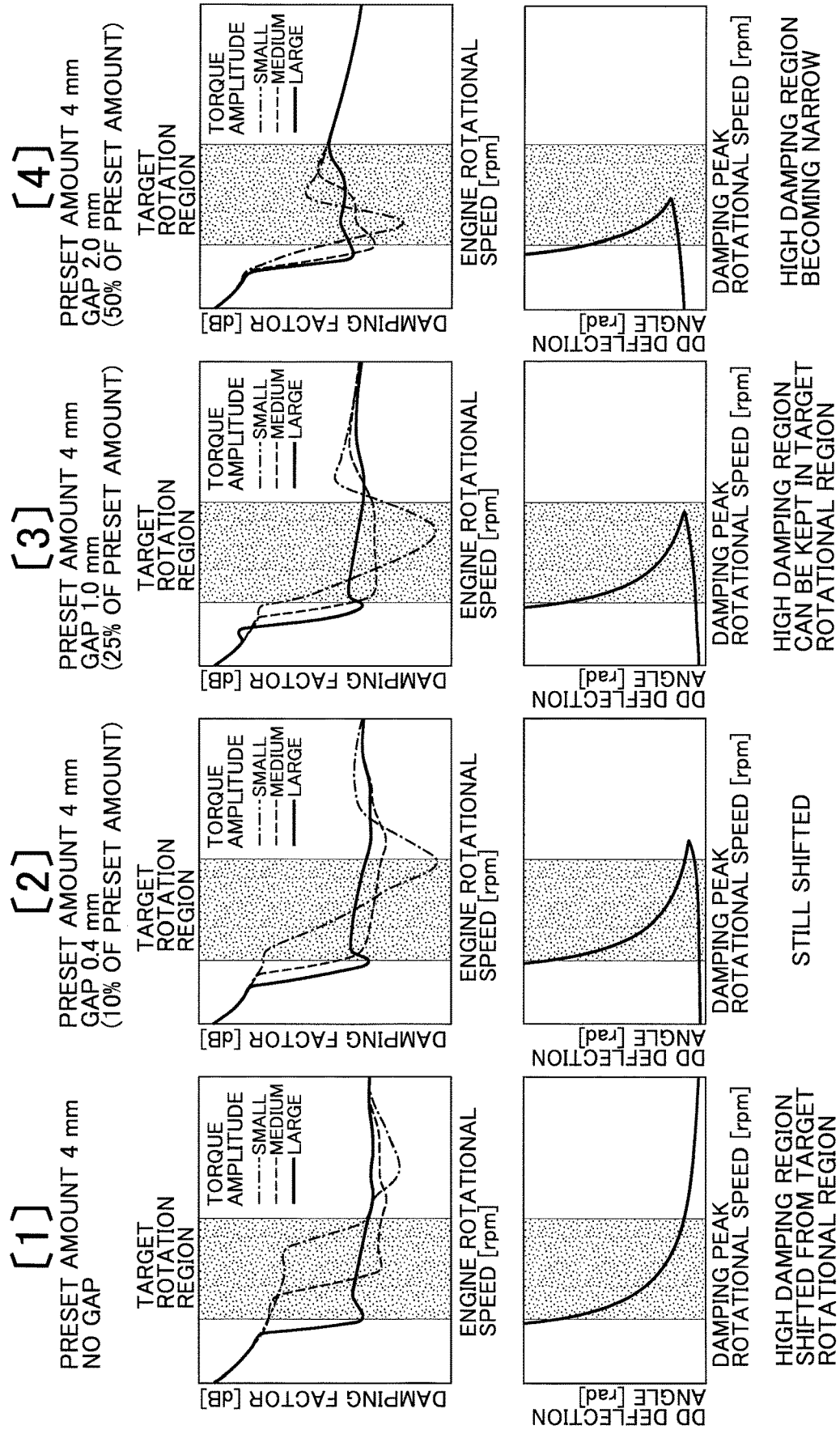
FIG. 11 shows graphs showing one example of the result of a simulation for setting an optimum relationship in magnitude between preset amount and backlash; [1] shows a case in which there is no backlash and [2] to [4] show a case in which a preset is applied and there is backlash and the magnitude relationship is changed in three stages.

With respect to an automobile equipped with a power transmission device in which the dynamic damper 49 is provided on a transmission rotating member (spring holder 42) in the intermediate portion between the first and second dampers 47, 48 as in the first embodiment, the damping characteristics of the power transmission device can be simulated by computation, and one example of the results is shown in FIG. 11. When carrying out the computation, various factors of the vibration model of each example are set by reference to those of a normal automobile.

In FIG. 11, [1] shows a case in which only a preset load is applied, and [2] to [4] show a case in which the gap C is specially provided in addition to the application of a preset load; in particular, [2] shows a case in which the gap C is 10% (for example 0.4 mm) of a preset amount Z (that is, the difference (for example 4 mm) in dimensions between a free length s of the dynamic damper spring 58 and a length a when the preset load is applied), [3] shows a case in which the gap C is similarly 25% thereof (for example 1.0 mm), and [4] shows a case in which the gap C is similarly 50% thereof (for example 2.0 mm). In each of the cases, the thickness of the lines corresponds to cases in which the torque amplitude Tw changes in three stages between large, medium, and small.

From the results of simulations based on comparison of the illustrated examples, it can be seen that, due to the gap C being specially provided, the shift of the damping peak to the high rotation side can be suppressed considerably, in particular when the torque amplitude Tw is small. For example, if there is no gap C as in the case of [1] of FIG. 11, when the torque amplitude Tw is small, the high damping region is shifted greatly from a target rotational region (for example 1000 to 1500 rpm, which is a usual rotation region of an automobile engine). Even if there is the gap C, when it is 10% or less of the preset amount Z (that is, in the case of [2]), the high damping region is still shifted from the target rotational region and, furthermore, when it is 50% or greater of the preset amount Z (that is, in the case of [4]), there is the problem that the high damping region in the target rotational region becomes narrow. On the other hand, when the gap C is within a range of 10% to 50% of the preset amount Z, the high damping region is appropriately kept within the target rotational region.

From this simulation result also, it can be seen that, in order to ensure as wide a high damping region as possible without deviating from a target rotational region (that is, reducing the variation of the damping peak), it is necessary to optimally set the gap C with respect to the preset amount Z. More specifically, it is desirable that the gap C is set so that $0.1Z<C<0.5Z$ holds.

As described above, in accordance with the first embodiment, the dynamic damper spring 58 is supported on the inertial rotating body 41 (specifically, the inertia plate 61) so as to apply a preset load thereto, and the backlash, that is, the gap C in the rotational direction, is set between the dynamic damper spring 58 and the transmission rotating member (specifically, the spring retaining plates 50, 51 of the spring holder 42) between the first and second dampers 47, 48. This not only enables the damping region of the dynamic damper 49 to be extended with a simple structure in which a preset load is applied and the gap C is added, but also prevents the damping peak of the extended damping region from shifting greatly and varying depending on the size of the input torque. As a result, a high performance dynamic damper that can achieve both the function of extending the damping region and the function of suppressing shifting of the damping peak can be obtained, and a high damping effect can be exhibited thereby regardless of the size of the input torque.

The above damping effect is explained in an easily understandable manner by reference to FIG. 12; in the case of [1] in which no preset load is applied and no gap C is specially provided, although a high damping effect is obtained in a target rotational region, the damping range is narrow, and there is the problem that only a very small part of the target rotational region is covered. In the case of [2] in which a preset load is applied but no gap C is specially provided (corresponding to Japanese Patent Application Laid-open No. 2017-155831), although the range in which a high damping effect is obtained is extended in a target rotational region, since the range shifts to the high rotation side as the input torque in particular lowers, a high damping effect cannot be obtained in a low torque region.

On the other hand, in the case of [3] in which a preset load is applied and the gap C is specially provided (corresponding to the present invention), it can be seen that due to the preset load being applied and the gap C being specially provided, the problems of case [2] are solved, that is, a high damping effect can be obtained over a wide range in a target rotational region regardless of the size of the input torque.

In the first embodiment, the inertia plate 61 of the inertial rotating body 41 includes a spring support part (that is, the elastic member-housing recess part 64) that engages so as to solely apply a preset load to the dynamic damper spring 58, and the gap C is set between the dynamic damper spring 58 and the pair of spring retaining members 50, 51 of the spring holder 42 as a transmission rotating member.

It thereby becomes possible to provisionally fix and retain the dynamic damper spring 58 to the inertia plate 61 during an assembly process for the device while solely applying a preset load by the inertia plate 61. Joining the pair of spring retaining plates 50, 51 to each other while sandwiching between the two spring retaining plates 50, 51 the dynamic damper spring 58 and the inertia plate 61 in the provisionally fixed state (in other words, a subassembly state in which the inertial rotating body 41 and the dynamic damper spring 58 are brought together) enables them to be easily brought together and assembled. Therefore, during the assembly process a resilient force of the dynamic damper spring 58 is not applied to the spring retaining plates 50, 51, the overall ease of assembly becomes very good, and the working efficiency can be improved.

Moreover, since the application and setting of a preset load to the dynamic damper spring 58 is carried out solely by the inertia plate 61 (that is, independently from the two spring retaining plates 50, 51), it is advantageous in terms of improving the precision with which the preset load is set.

Furthermore, in the first embodiment, since the pair of dampers 47, 48 are disposed in series in the torque transmission path 46, and the transmission rotating member (specifically, the spring holder 42) having the dynamic damper 49 attached thereto is disposed in the intermediate portion between the pair of dampers 47, 48 within the power transmission path 46, it is possible to avoid any effect from antiresonance, thereby further improving the damping performance Moreover, since the turbine runner 12 of the first embodiment is fixed to a member (output hub 29) that rotates integrally with the output shaft 27, even when the inertial mass on the output side of the torque converter TC is small, this can be compensated for by the turbine runner 12, and the damping performance can be further improved.

Furthermore, in the present embodiment, since the first damper 47, which has the first damper spring 55 retained by the clutch piston 43, is disposed between the clutch piston 43 and the pair of retaining plates 50, 51, and the second damper 48 is disposed between the pair of retaining plates 50, 51 and the driven plate 52, which rotates integrally with the output shaft 27, it is possible to improve the damping performance of the two dampers 47, 48 while avoiding any increase in the dimensions of the torque converter TC. Moreover, since the second damper spring 70 forming part of the second damper 48 is retained between the pair of retaining plates 50, 51, the second damper spring 70 of the second damper 48 and the dynamic damper spring 58 of the dynamic damper 49 are both retained between the pair of retaining plates 50, 51, and it thus becomes unnecessary to dispose the dynamic damper spring 58 on the inertial rotating body 41 side, thus enabling the shape of the inertial rotating body 41 to be simplified and ensuring a sufficient inertial mass for the inertial rotating body 41 and thereby sufficiently enhancing the damping performance of the dynamic damper 49.

Figure 13:
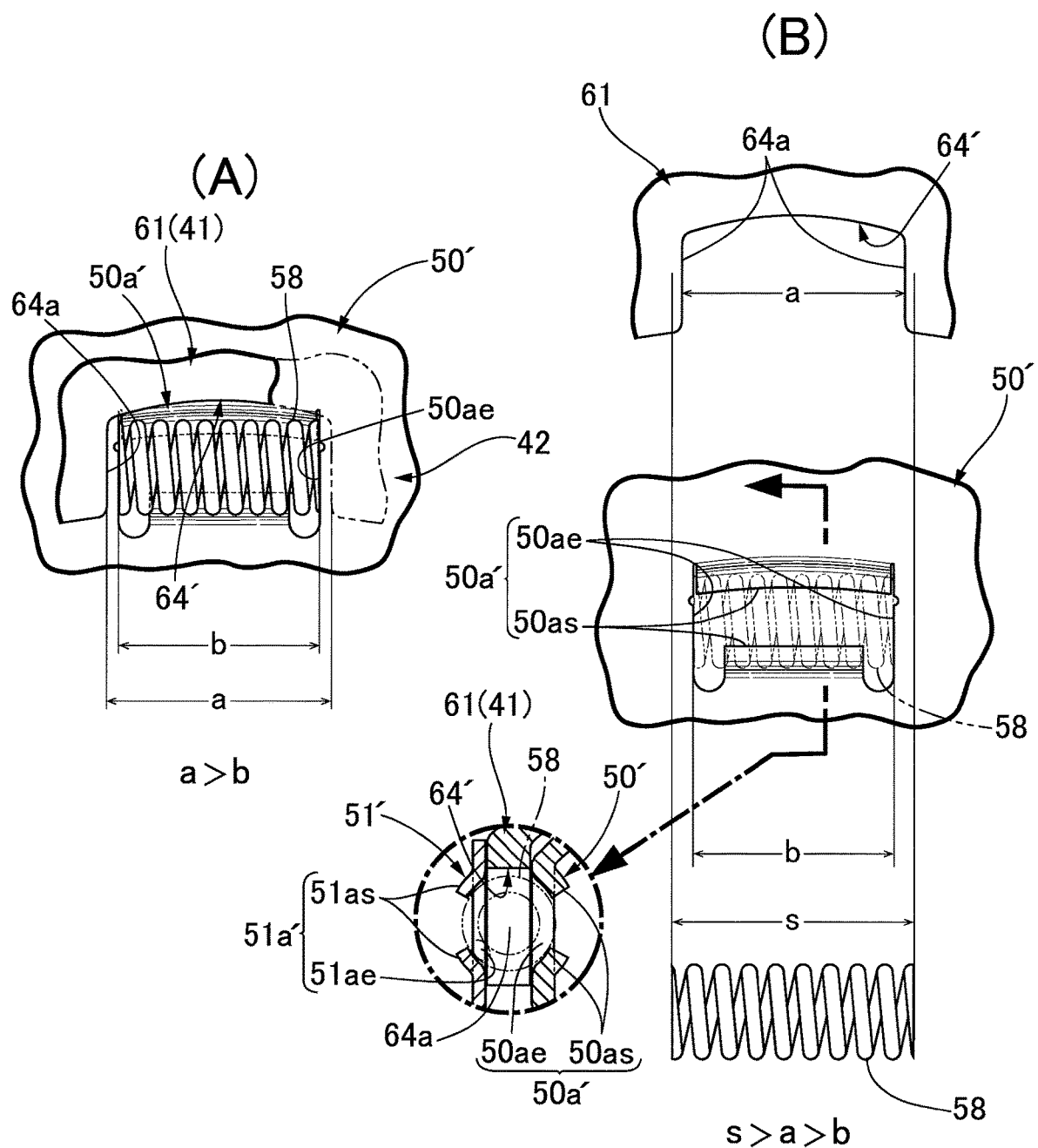
FIG. 13 shows views showing a support structure for a dynamic damper spring related to a second embodiment; (A) is a view corresponding to FIGS. 5(A) and (B) is a view corresponding to FIG. 5(B).

FIG. 13 shows a second embodiment of the present invention. When the lockup clutch 40 is in a non-connected state (that is, the torque transmission path 46 is in a non-transmitting state), in the first embodiment a preset load is applied to the dynamic damper spring 58 by the spring support part (that is, the elastic member-housing recess part 64 of the inertia plate 61) of the inertial rotating body 41, and the gap C in the rotational direction is set between the dynamic damper spring 58 and the retaining plates 50, 51 of the spring holder 42 as the transmission rotating member, whereas in the second embodiment, in contrast to the first embodiment, a preset load is applied to the dynamic damper spring 58 by a pair of retaining plates 50', 51' of the spring holder 42 as the transmission rotating member, and the gap C in the rotational direction is set between the dynamic damper spring 58 and the spring engagement part of the inertial rotating body 41 (that is, an elastic member-housing recess part 64' of the inertia plate 61).

That is, in the second embodiment, when the torque transmission path 46 is in a non-transmitting state, the spring holder 42 retains the dynamic damper spring 58 in a compressed state (that is, a state in which a preset load is applied) between a pair of spring end support portions 50ae, 51ae of spring-holding portions 50a', 51a' of the pair of retaining plates 50', 51', and on the other hand the backlash, that is, the gap C in the rotational direction, is set between opposite end parts 64a of the elastic member-housing recess part 64' in the peripheral direction of the inertia plate 61 and the opposite end parts of the dynamic damper spring 58. The pair of retaining plates 50', 51' are one example of a pair of the spring retaining members.

In the second embodiment, when the length between the opposite end parts 64a of the elastic member-housing recess part 64' in the peripheral direction of the inertia plate 61 is a, the length between the pair of spring end support portions 50ae, 51ae of each of the spring-holding portions 50a', 51a' is b, and the length of the dynamic damper spring 58 in a free state is s, each of the lengths a, b, s is set so as to satisfy the relationship s>a>b. In this case, the gap C is (a-b), and the preset amount Z of the dynamic damper spring 58 is (s-b).

The arrangement of the second embodiment is otherwise basically the same as that of the first embodiment; each constituent element is denoted by the same reference numerals and symbols as those of the corresponding constituent element of the first embodiment, and further explanation is omitted. Therefore, in the second embodiment, basically the same operational effects as those of the first embodiment can also be achieved.

Furthermore, in accordance with the second embodiment, since the pair of spring retaining plates 50', 51' retaining the dynamic damper spring 58 engage with the spring 58 via the spring end support portions 50ae, 51ae so as to apply a preset load thereto, the inertia plate 61 of the inertial rotating body 41 includes a spring engagement part (that is, the elastic member-housing recess part 64') that can engage with the dynamic damper spring 58, and the gap C is set between the spring engagement part 64' and the dynamic damper spring 58, a preset load is applied in a state in which the dynamic damper spring 58 is stably engaged via the pair of spring retaining plates 50', 51', and the attitude of the spring 58 can be stabilized in the preset state. This enables the effect of the dynamic damper 49 in suppressing shifting of the damping peak to be more reliably achieved.

Figure 14:
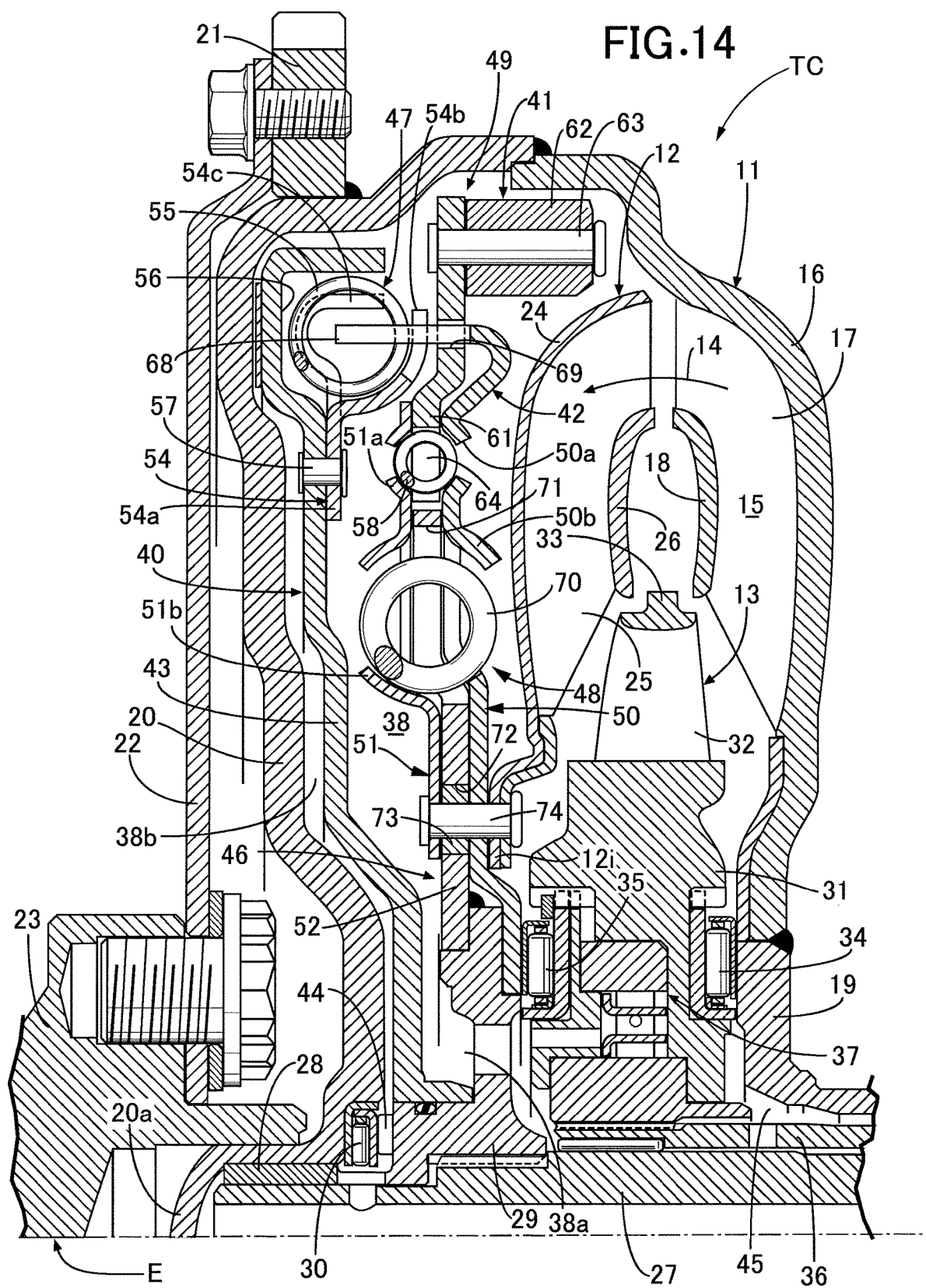
FIG. 14 is a view corresponding to FIG. 1 showing a third embodiment.

FIG. 14 shows a third embodiment of the present invention. The first embodiment illustrates a case in which the turbine runner 12 is fixed to a member (for example the output hub 29) rotating integrally with the output shaft 27, but the third embodiment is different therefrom in that the turbine runner 12 is joined to the spring holder 42 as a transmission rotating member disposed in the intermediate portion between the first and second dampers 47, 48 within the torque transmission path 46 between the clutch piston 43 and the output shaft 27.

The spring holder 42 has basically the same structure as the spring holder 42 of the first embodiment with respect to the structure via which it is connected to the first and second dampers 47, 48 and the structure via which it is connected to the dynamic damper 49. That is, in the third embodiment, as in the first embodiment, means for joining the spring holder 42 and the driven plate 52 of the second damper 48 includes a cylindrical spacer 73 that is inserted through each of elongated holes 72 bored at intervals in the driven plate 52 and extending in the peripheral direction and that is disposed between the pair of retaining plates 50, 51, and a plurality of rivets 74 extending through the spacer 73 and the retaining plates 50, 51, and in the third embodiment in particular, an inner peripheral portion 12i of the turbine runner 12 and the retaining plates 50, 51 are fixed and fastened together by means of the rivet 74, and the driven plate 52 is fixed (for example welded) only to the output hub 29, the turbine runner 12 not being fixed to the driven plate 52.

The arrangement of the third embodiment is otherwise basically the same as that of the first embodiment; each constituent element is denoted by the same reference numerals and symbols as those of the corresponding constituent element of the first embodiment, and further explanation is omitted. Therefore, in the third embodiment, basically the same operational effects as those of the first embodiment can also be achieved.

Furthermore, in accordance with the third embodiment, since the turbine runner 12 is fixed to the transmission rotating member (more specifically, the pair of spring retaining plates 50, 51 of the spring holder 42) forming part of the torque transmission path 46 in the intermediate portion between the pair of dampers 47, 48 disposed in series in the torque transmission path 46, it is possible to increase the inertial mass of the transmission rotating member (spring holder 42) between the pair of dampers 47, 48 by means of the turbine runner 12, thereby further improving the damping performance.

Figure 15:
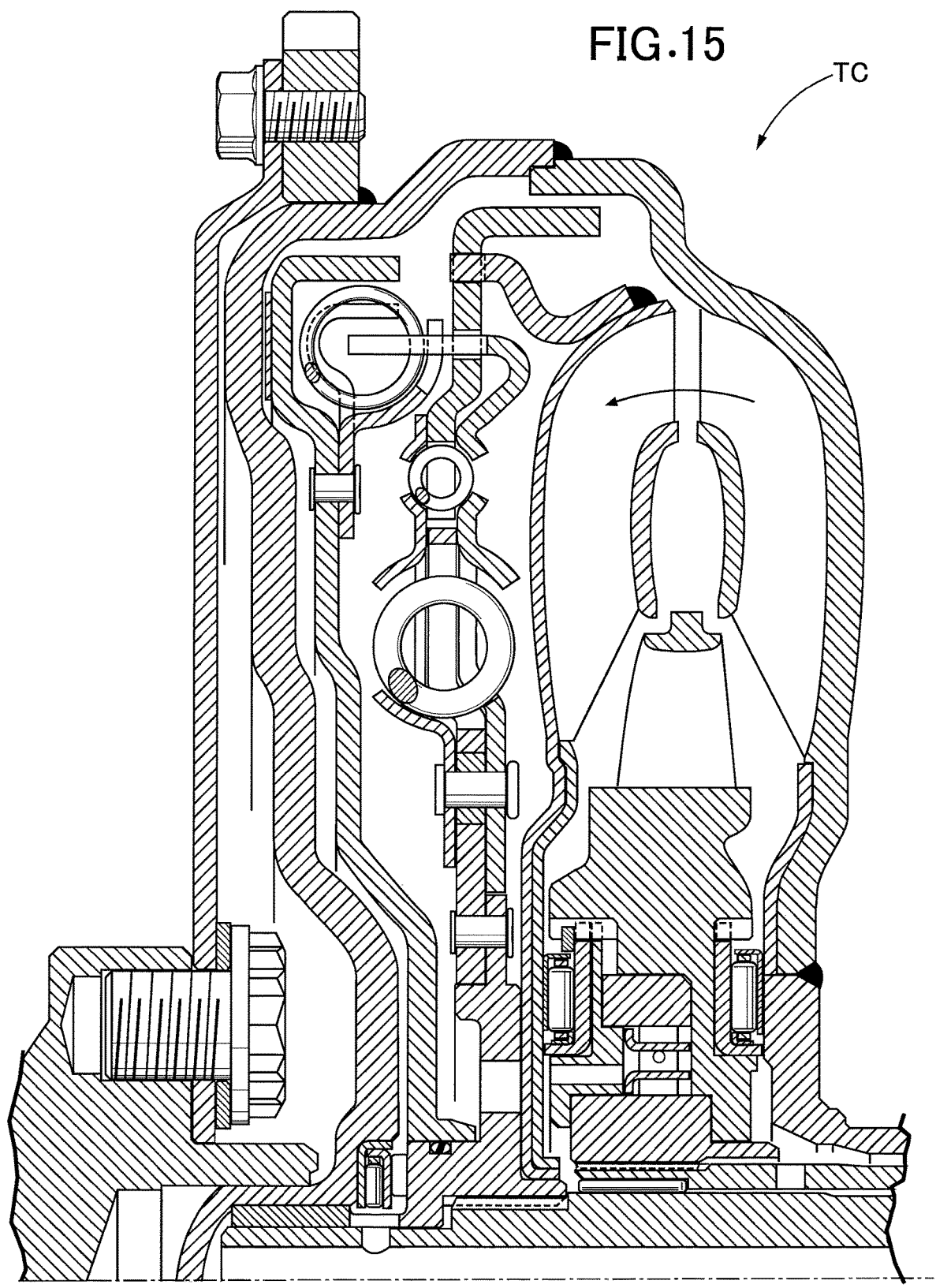
FIG. 15 is a view corresponding to FIG. 1 showing a fourth embodiment.
Figure 16:
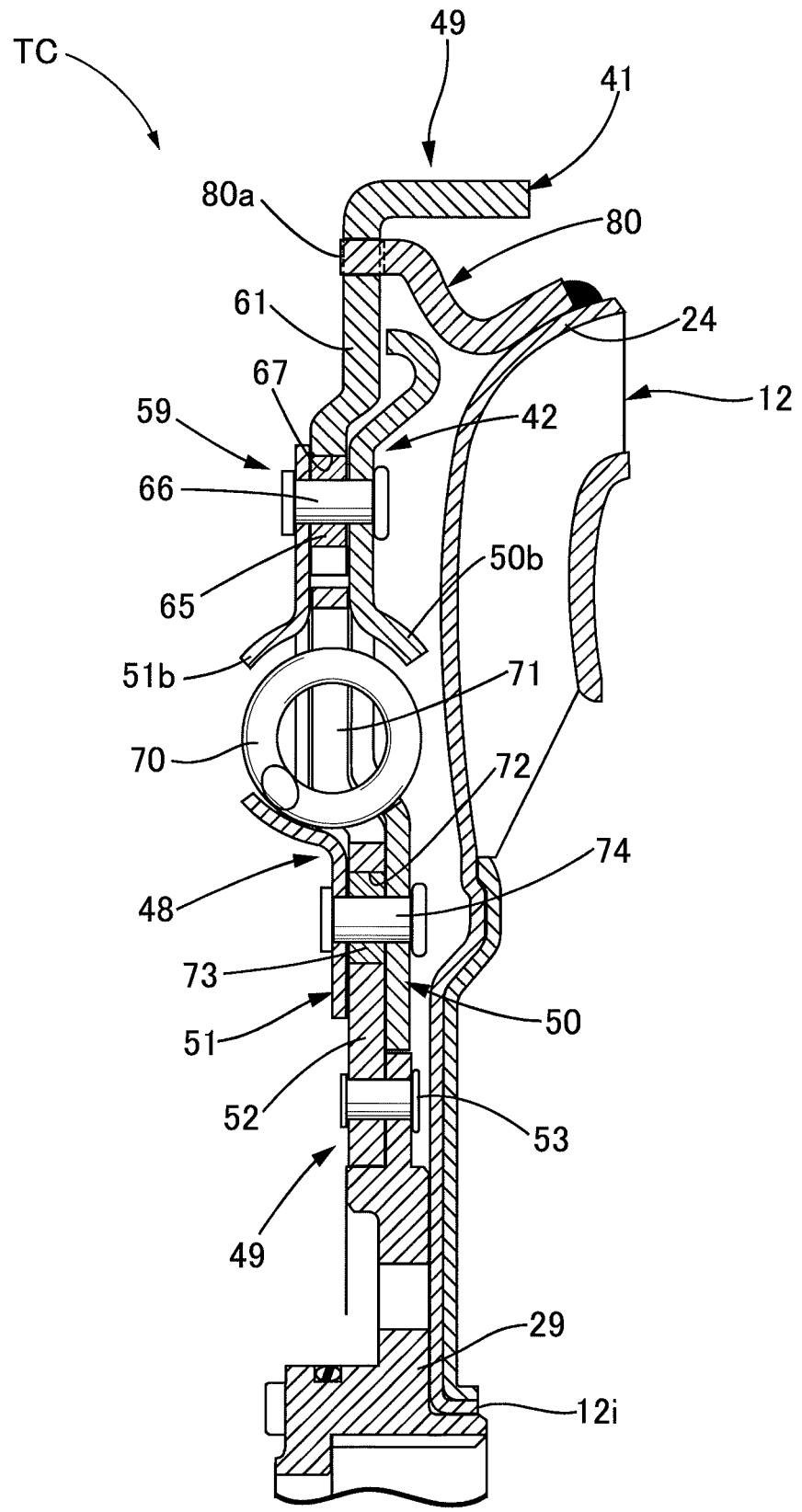
FIG. 16 is a view corresponding to FIG. 3 showing the fourth embodiment.

FIG. 15 and FIG. 16 illustrate a fourth embodiment of the present invention. The first embodiment illustrates a case in which the turbine runner 12 is provided separately and independently from the inertial rotating body 41 and is fixed to a member (for example the output hub 29) rotating integrally with the output shaft 27, but in the fourth embodiment the turbine runner 12 is fixed to the inertia plate 61 so as to function as a mass body that replaces the weight member 62 of the inertial rotating body 41. That is, the turbine runner 12 of the fourth embodiment is joined integrally and rotatably to the inertia plate 61 via a relay member 80 so as to function as at least part of a mass body of the inertial rotating body 41.

A base part of the relay member 80 is joined (for example welded) to an outer peripheral part of the turbine runner 12, and an extremity thereof has an engagement projection portion 80a that extends through and engages with the inertia plate 61. Furthermore, an inner peripheral portion 12i of the turbine runner 12 is rotatably fitted to and supported on the output hub 29.

The arrangement of the fourth embodiment is otherwise basically the same as that of the first embodiment; each constituent element is denoted by the same reference numerals and symbols as those of the corresponding constituent element of the first embodiment, and further explanation is omitted. Therefore, in the fourth embodiment, basically the same operational effects as those of the first embodiment can also be achieved.

Furthermore, in accordance with the fourth embodiment, since the turbine runner 12 functions as at least part of a mass body (weight member) of the inertial rotating body 41, a mass body for exclusive use provided on the outer diameter side of the inertial rotating body 41 can be made small or omitted, and the dynamic damper 49 can be reduced in size and weight.

Embodiments of the present invention are explained above, but the present invention is not limited to the above-mentioned embodiments and may be modified in a variety of ways as long as the modifications do not depart from the gist of the present invention.

For example, although the embodiments illustrate as a power transmission device the power transmission device for a torque converter that can transmit the rotational power of an engine from the lockup clutch 40 of the torque converter TC to the output shaft 27 side of the torque converter TC in a state in which the lockup clutch 40 is connected, the application of a power transmission device related to the first and sixth aspects of the present invention is not limited to use in a torque converter. For example, the present invention can be applied to any power transmission device regardless of the purpose of application as long as at least one damper involved in power transmission is disposed in the torque transmission path 46 as a power transmission path that can transmit rotational power from an engine, and a dynamic damper is added thereto.

Furthermore, the embodiments illustrate an arrangement in which the first and second dampers 47, 48, which are separate and independent from the dynamic damper 49, are disposed in series in the torque transmission path 46, but in the present invention the number of dampers disposed other than the dynamic damper 49 may be only one, or there may be three or more.

The power transmission device of Japanese Patent Application Laid-open No. 2017-155831 has a structure in which a preset load is applied to the dynamic damper spring by engaging in a non-transmitting state the dynamic damper spring with the pair of spring retaining members of the transmission rotating member and the spring support member of the inertial rotating body held between the spring retaining members, without any gaps.

Because of this, when joining the pair of spring retaining members while sandwiching the dynamic damper spring and the spring support member between the two spring retaining members during an assembly process for the device, it is necessary to carry out the assembly operation in a state in which the resilient force of the dynamic damper spring is applied to both the spring support member and the two spring retaining members, the operating steps become complicated overall, and the cost might be increased.

As a reference embodiment of a power transmission device that can solve the above problems with a simple structure, the following structure (structure shown in FIG. 1 to FIG. 5 and FIG. 14 to FIG. 16) is proposed.

That is, there is proposed a power transmission device in which a dynamic damper (49) is provided in a power transmission path (46) having at least one damper (47, 48) disposed therein, the dynamic damper (49) has an inertial rotating body (41) that can rotate relative to a transmission rotating member (42) forming part of the power transmission path (46), and a dynamic damper spring (58) that can provide connection between the transmission rotating member (42) and the inertial rotating body (41), and a preset load is applied to the dynamic damper spring (58) in a non-transmitting state of the power transmission path (46), wherein either one of the transmission rotating member (42) and the inertial rotating body (41) comprises a spring support member (61) that is engaged so as to solely apply the preset load to the dynamic damper spring (58) in the non-transmitting state, the other one of the transmission rotating member (42) and the inertial rotating body (41) comprises a pair of spring retaining members (50, 51) that are linked to each other and sandwich the spring support member (61) therebetween, the pair of spring retaining members (50, 51) have spring-holding portions (50a, 51a) retaining the dynamic damper spring (58), and a gap (C) in the rotational direction is set between the spring-holding portions (50a, 51a) and the dynamic damper spring (58) in the non-transmitting state. Since it is thereby possible in an assembly process for the device to provisionally retain the dynamic damper spring (58) on the spring support member (61) while solely applying a preset load by the spring support member (61), joining the pair of spring retaining members (50, 51) while sandwiching the spring support member (61) and the dynamic damper spring (58), which is in a provisionally retained state, between the spring retaining members (50, 51) enables them to be easily brought together and assembled. The resilient force of the dynamic damper spring (58) is therefore not applied to the spring retaining members (50, 51) during the assembly process, the overall ease of assembly is very good, and a contribution can be made to improving the operating efficiency.

Although the embodiments of the present invention illustrate an arrangement in which the gap C set between the dynamic damper spring 58 and the pair of spring retaining plates 50, 51 when the power transmission path 46 is in a non-transmitting state is set to be a size that can suppress variation of the damping peak of the extended damping region based on a preset load being applied to the dynamic damper spring 58, in the reference embodiment described above, the gap C set between the dynamic damper spring 58 and the pair of spring retaining plates 50, 51 in the non-transmitting state can be set only from the viewpoint of improving the ease of assembly of the device (that is, without taking into consideration the viewpoint of suppressing variation of the damping peak).

More specifically, the gap C in the reference embodiment is provided as a gap that prevents a resilient force, that is, a preset load, of the dynamic damper spring 58 from being imposed on the pair of spring retaining plates 50, 51 during the assembly process of the device (in particular, an assembly process in which the two spring retaining plates 50, 51 are joined to each other in a state in which the inertia plate 61 engaging with the dynamic damper spring 58 so as to apply a preset load thereto is sandwiched between the two spring retaining plates 50, 51).

Therefore, the gap C in the reference embodiment has a relatively high degree of freedom in setting the gap size compared with the gap C of the embodiments of the present invention, which is set mainly in order to suppress variation of the damping peak. That is, the gap C of the reference embodiment can be set smaller or larger than the gap C of the embodiments of the present invention at least as long as the ease of assembly is not impaired. For example, when the gap C of the reference embodiment is set at a minimum requirement size that can prevent a resilient force (that is, a preset load) of the dynamic damper spring 58 from being imposed on the two spring retaining plates 50, 51 during the assembly process, it is possible, by minimizing the gap C, to minimize the occurrence of backlash accompanying the gap C being specially provided.

What is claimed is:

1. A power transmission device in which
a dynamic damper is provided in a power transmission path having at least one damper disposed therein,
the dynamic damper has an inertial rotating body that can rotate relative to a transmission rotating member forming part of the power transmission path, and a dynamic damper spring that can provide connection between the transmission rotating member and the inertial rotating body, and
a preset load is applied to the dynamic damper spring in a non-transmitting state of the power transmission path,
wherein the dynamic damper spring is supported on either one of the transmission rotating member and the inertial rotating body so as to apply the preset load to the dynamic damper spring in the non-transmitting state,
a gap is set in a rotational direction in the non-transmitting state between the dynamic damper spring and an other one of the transmission rotating member and the inertial rotating body, and
the gap is set so that when the gap is C [mm] and a preset amount of the dynamic damper spring is Z [mm], $0.1Z < C < 0.5Z$ holds.

2. The power transmission device according to claim 1, wherein the gap is set so that when the gap is C [rad], a torque due to the preset load of the dynamic damper spring is $T_p$ [Nm], and
a spring stiffness of the dynamic damper spring is k [Nm/rad],
$C < T_p/k$ holds.

3. The power transmission device according to claim 1, wherein
either one of the transmission rotating member and the inertial rotating body comprises a spring support part that is engaged so as to solely apply the preset load to the dynamic damper spring in the non-transmitting state, and
an other one of the transmission rotating member and the inertial rotating body comprises a pair of spring retaining members that are linked to each other and retain the dynamic damper spring therebetween, the gap being set between the spring retaining members and the dynamic damper spring in the non-transmitting state.

4. The power transmission device according to claim 3, wherein
at least first and second dampers as said damper are disposed in series in the power transmission path, and the transmission rotating member comprising the pair of spring retaining members is disposed in an intermediate portion between the first and second dampers within the power transmission path,
the pair of spring retaining members have a spring-holding portion that retains the dynamic damper spring, and retain a damper spring of the second damper via a portion that is different from the spring-holding portion, and
the damper spring of the second damper is disposed between the pair of spring retaining members and a member further on a downstream side than the transmission rotating member within the power transmission path.

5. The power transmission device according to claim 4, wherein
in a connected state of a lockup clutch in a torque converter, rotational power from an engine is transmitted from the lockup clutch to an output shaft of the torque converter via the power transmission path.

6. The power transmission device according to claim 5, wherein a damper spring of the first damper is disposed between one of the spring retaining members and a clutch piston of the lockup clutch.

7. The power transmission device according to claim 5, wherein a turbine runner of the torque converter is fixed to the output shaft or a member that rotates integrally with the output shaft.

8. The power transmission device according to claim 5, wherein the turbine runner of the torque converter is fixed to the transmission rotating member.

9. The power transmission device according to claim 5, wherein the turbine runner of the torque converter forms at least part of a mass body in the inertial rotating body.

10. The power transmission device according to claim 1, wherein
either one of the transmission rotating member and the inertial rotating body comprises a pair of spring retaining members that are linked to each other and retain the dynamic damper spring therebetween, the spring retaining members being engaged so as to apply the preset load to the dynamic damper spring in the non-transmitting state, and
an other one of the transmission rotating member and the inertial rotating body comprises a spring engagement part that can engage with the dynamic damper spring, the gap being set between the spring engagement part and the dynamic damper spring in the non-transmitting state.

11. The power transmission device according to claim 1, wherein the gap is set at a size that can suppress variation, in response to a change in an input torque, of a damping peak of a damping region of the dynamic damper that is extended based on the preset load being applied.

* * * * *